(12) United States Patent
Kemp et al.

(10) Patent No.: US 9,611,945 B2
(45) Date of Patent: Apr. 4, 2017

(54) FAUCET WATERWAY

(71) Applicant: DELTA FAUCET COMPANY, Indianapolis, IN (US)

(72) Inventors: Matthew L. Kemp, Indianapolis, IN (US); Brian A. Enlow, Noblesville, IN (US); Dewayne Davis, Lebanon, IN (US)

(73) Assignee: Delta Faucet Company, Indianapolis, IN (US)

( * ) Notice: Subject to any disclaimer, the term of this patent is extended or adjusted under 35 U.S.C. 154(b) by 33 days.

(21) Appl. No.: 14/426,055

(22) PCT Filed: Aug. 30, 2013

(86) PCT No.: PCT/US2013/057607
§ 371 (c)(1),
(2) Date: Mar. 4, 2015

(87) PCT Pub. No.: WO2014/039397
PCT Pub. Date: Mar. 13, 2014

(65) Prior Publication Data
US 2015/0211646 A1    Jul. 30, 2015

Related U.S. Application Data

(60) Provisional application No. 61/697,683, filed on Sep. 6, 2012.

(51) Int. Cl.
*F16K 11/078* (2006.01)
*F16K 31/60* (2006.01)
*F16K 11/00* (2006.01)
*E03C 1/04* (2006.01)

(52) U.S. Cl.
CPC ........ *F16K 11/0785* (2013.01); *F16K 19/006* (2013.01); *F16K 31/605* (2013.01); *E03C 1/04* (2013.01); *Y10T 137/86549* (2015.04); *Y10T 137/86823* (2015.04)

(58) Field of Classification Search
CPC .... F16K 11/0785; F16K 19/06; F16K 31/605; E03C 1/04; Y10T 137/86823; Y10T 137/86549
See application file for complete search history.

(56) References Cited

U.S. PATENT DOCUMENTS

| 4,043,359 A | 8/1977 | Christo |
| 4,610,429 A * | 9/1986 | Arnold .................. E03C 1/0403 137/625.41 |
| 5,575,424 A * | 11/1996 | Fleischmann ............. E03C 1/04 137/218 |

(Continued)

FOREIGN PATENT DOCUMENTS

WO    WO2010099397 A1    9/2010

OTHER PUBLICATIONS

International Search Report and Written Opinion dated Apr. 8, 2014 of parent International Application No. PCT/US2013/057607.

*Primary Examiner* — Craig Schneider
*Assistant Examiner* — Kevin Barss
(74) *Attorney, Agent, or Firm* — Faegre Baker Daniels LLP

(57) ABSTRACT

A fluid delivery device including a waterway assembly, a valve cartridge, and a waterway adapter to fluidly couple the waterway assembly to the valve cartridge and to provide a fluid passageway to a spout outlet.

18 Claims, 27 Drawing Sheets

(56) References Cited

U.S. PATENT DOCUMENTS

| | | |
|---|---|---|
| 6,868,564 B2 | 3/2005 | Ginter et al. |
| 7,182,100 B2 | 2/2007 | Pinette |
| 7,556,061 B2 | 7/2009 | Morita et al. |
| 7,766,043 B2 | 8/2010 | Thomas et al. |
| 7,980,268 B2 | 7/2011 | Rosko et al. |
| 8,240,326 B2 | 8/2012 | Kacik et al. |
| 2009/0020177 A1 | 1/2009 | Nelson et al. |
| 2009/0242051 A1* | 10/2009 | Xinlu .................. E03C 1/04 137/603 |
| 2009/0297390 A1 | 12/2009 | Hidenobu et al. |
| 2010/0127202 A1 | 5/2010 | Bors et al. |
| 2010/0313979 A1 | 12/2010 | Thomas |
| 2011/0016625 A1 | 1/2011 | Marty et al. |
| 2011/0127301 A1 | 6/2011 | Weber |
| 2011/0297248 A1 | 12/2011 | Nelson et al. |
| 2012/0018009 A1 | 1/2012 | Veros et al. |
| 2012/0018020 A1 | 1/2012 | Moore et al. |
| 2012/0048394 A1 | 3/2012 | Lin |

\* cited by examiner

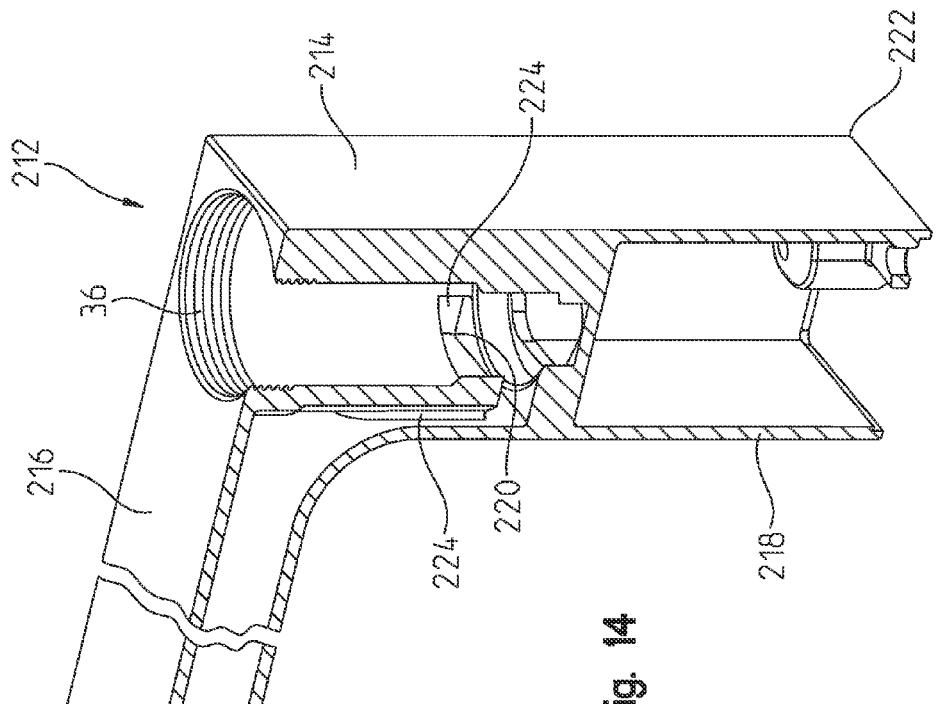
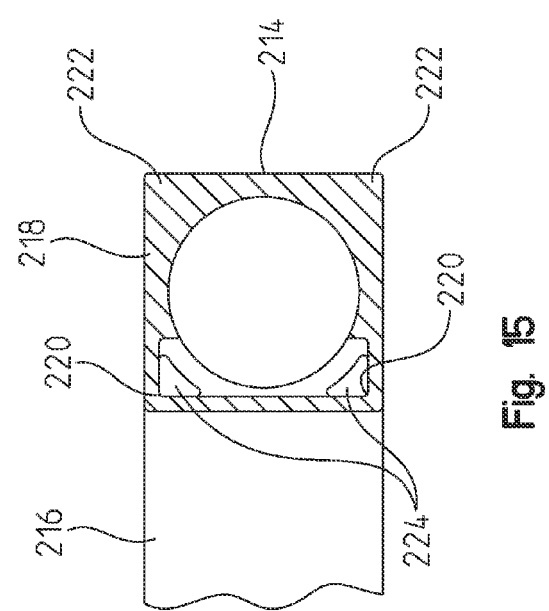

US 9,611,945 B2

FAUCET WATERWAY

CROSS-REFERENCE TO RELATED APPLICATIONS

The present application is a 371 national phase filing of International Application No. PCT/US2013/057607, filed Aug. 30, 2013, which claims the benefit of U.S. Provisional Patent Application Ser. No. 61/697,683, filed Sep. 6, 2012, the disclosures of which are expressly incorporated by reference herein.

BACKGROUND AND SUMMARY OF THE INVENTION

The present invention relates generally to plumbing fixtures and, more particularly, to faucet waterways.

Single handle faucets typically include mixing valves that control the flow of both hot and cold water to a delivery spout. These faucets have found wide acceptance and are commonly constructed such that the handle or knob is moveable in distinct directions to adjust the temperature of outlet water, by controlling the mixture of hot and cold inlet water, and to adjust the flow rate of the mixed outlet water. The present disclosure provides a waterway that accommodates single handle faucets having a small hub and/or an elevated spout.

According to an illustrative embodiment of the present disclosure, a fluid delivery device includes a spout assembly having a hub portion and a hollow spout outlet portion. The hub portion is configured to be supported by a mounting deck, and the spout outlet portion is configured to be cantilevered from the hub portion and includes a spout outlet configured to dispense water. A waterway assembly includes a lower wall, a hot water inlet tube extending downwardly from the lower wall, and a cold water inlet tube extending downwardly from the lower wall. The lower wall couples the hot water inlet tube with the cold water inlet tube. One of a hot water receiving bore and a hot water tubular projection is supported by the lower wall. One of a cold water receiving bore and a cold water tubular projection is supported by the lower wall. An adapter is positioned above the lower wall of the waterway assembly and includes an upper wall. An outlet passageway extends through the upper wall. One of the other of the hot water tubular projection and the hot water receiving bore is supported by the upper wall. One of the other of the cold water tubular projection and the cold water receiving bore is supported by the upper wall. A fluid chamber is defined between the lower wall of the waterway assembly and the upper wall of the adapter. The outlet passageway and the spout outlet are in fluid communication with the fluid chamber. A lower radial seal is supported by the waterway assembly, and an upper radial seal is supported by the adapter. A valve assembly is supported by the adapter and includes a hot water inlet port in fluid communication with the hot water inlet tube, a cold water inlet port in fluid communication with the cold water inlet tube, and an outlet water port in fluid communication with the outlet passageway of the adapter. The valve assembly is configured to control water flow through the hot water inlet tube and the cold water inlet tube to the fluid chamber.

According to a further illustrative embodiment of the present disclosure, the spout outlet portion of the spout assembly is elevated above the fluid chamber. In one illustrative embodiment, the hub portion includes a rectangular side wall, and a bore is formed within a corner of the side wall of the hub portion to provide fluid communication between the fluid chamber and the spout outlet portion. In another illustrative embodiment, a sleeve is received around the valve assembly to provide fluid communication between the fluid chamber and the spout outlet portion. Illustratively, an outer radial seal is positioned between an upper portion of the sleeve and the hub portion, wherein the lower radial seal is positioned between the waterway assembly and the hub portion, and the upper radial seal is positioned between a lower portion of the sleeve and the adapter.

According to an illustrative embodiment of the present disclosure, the adapter has material hardness greater than that of waterway assembly. Illustratively, the waterway assembly is formed of a cross-linked polyethylene (PEX), and the adapter is formed of a polysulfone.

According to an illustrative embodiment of the present disclosure, the hub is cast from a lead-free brass.

According to an illustrative embodiment of the present disclosure, a face seal is positioned between the adapter and the valve assembly, and a nut is threadably received within the hub portion for securing the valve assembly within the spout assembly and compressing the face seal between the adapter and the valve assembly.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 14 is a perspective view of the spout of FIG. 9, with a cross-section taken along line 14-14;

FIG. 15 is a cross-sectional view taken along line 15-15 of FIG. 9;

DETAILED DESCRIPTION OF THE DRAWINGS

Figure 1:
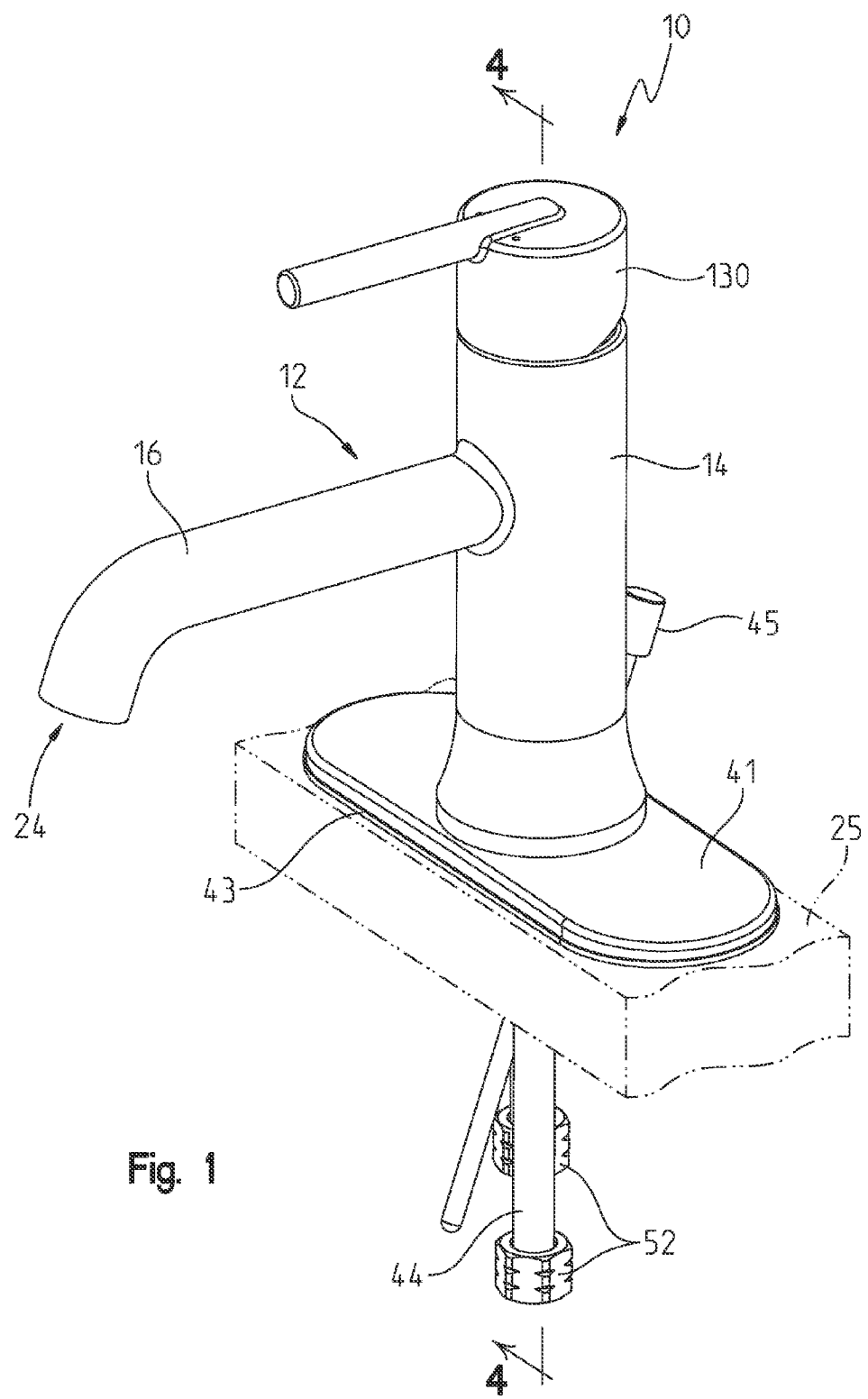
FIG. 1 is a perspective view of an illustrative embodiment faucet of the present disclosure mounted to a sink deck.

The embodiments of the invention described herein are not intended to be exhaustive or to limit the invention to precise forms disclosed. Rather, the embodiments elected for description have been chosen to enable one skilled in the art to practice the invention.

Referring initially to FIGS. 1-7B, an illustrative embodiment water delivery device or faucet 10 is shown including a spout assembly 12 having a hub portion 14 and a spout outlet portion 16. A waterway assembly 18, a waterway adapter 20, and a valve assembly 22 are received within the hub portion 16 of the spout assembly 12. In operation, the faucet 10 receives water from hot and cold water supplies (not shown) and mixes the incoming water to form an outlet stream delivered to a spout outlet 24 defined by the outlet portion 16 of the spout assembly 12. The faucet 10 may be mounted to a sink deck 25 or another suitable surface, and may deliver the mixed water outlet stream into a sink basin (not shown) for example. For example, a conventional externally threaded shaft or shank 27 may cooperate with a mounting nut (not shown) to secure the spout assembly 12 to the sink deck 25.

The illustrative hub portion 14 of the spout assembly 12 includes a hollow stepped chamber 29 and is disposed in a generally vertical orientation. The outlet portion 16 is also generally hollow and is coupled to the hub portion 14 in a generally horizontal fashion. In the illustrative embodiment of FIGS. 1-7B, the hub portion 14 includes a cylindrical side wall 26 having an open lower end 28 that is configured to rest adjacent the sink deck 25. Hub portion 14 also includes an upper end 30 that illustratively receives the valve assembly 22 and has an opening through which extends a valve stem 34 of the valve assembly 22. More particularly, upper end 30 of the hub portion 14 includes an internally threaded bore 36 that may be sized to receive and engage an externally threaded bonnet nut 38, for example, thereby securing the valve assembly 22, waterway adapter 20, and waterway assembly 18 within the hub portion 14. A conventional aerator 37 (including a flow regulator) and o-ring 39 may be supported by the outlet portion 16 of the spout assembly 12 and define the spout outlet 24.

In certain illustrative embodiments, an escutcheon or trim 41 is positioned below the hub portion 14 of the spout assembly 12. The escutcheon 41 may be of conventional design as formed from a plated zinc material. An elastomeric gasket 43 is illustratively positioned intermediate the escutcheon 41 and the sink deck 25. A lift rod 45 may be movably supported by the spout assembly 12 and is configured to operate a conventional pop-up drain assembly supported by the sink basin (not shown).

Spout assembly 12 is illustratively formed from a traditional metallic material, such as zinc or brass. In the illustrative embodiment detailed herein, the spout assembly 12 is cast from a "lead-free" brass. "Lead-free" brass is commonly understood to mean that the weighted average lead content within a brass alloy does not exceed 0.25%. (See, e.g., NSF/ANSI Standard 61 and the U.S. Safe Drinking Water Act (SDWA)). It is also within the scope of the present disclosure that the spout assembly may be formed of a non-metallic material, such as a polymer, illustratively a cross-linkable polymer. Suitable non-metallic materials that may be used to construct a spout assembly include cross-linkable polyethylene (PEX), polybutylene terephthalate (PBT), polyester, melamine, melamine urea, and melamine phenolic.

Figure 2:
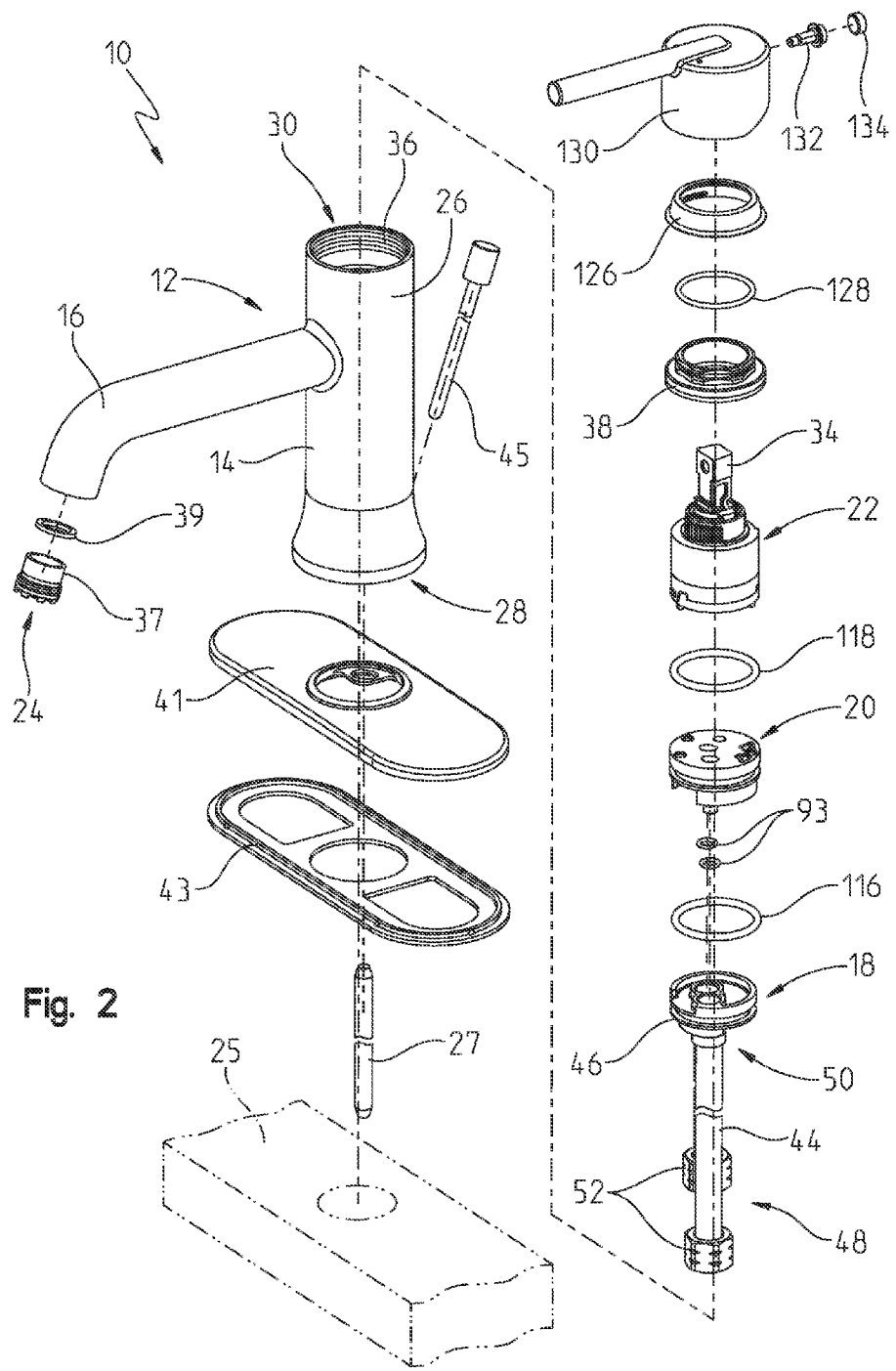
FIG. 2 is a top exploded perspective view of the faucet of FIG. 1.
Figure 3:
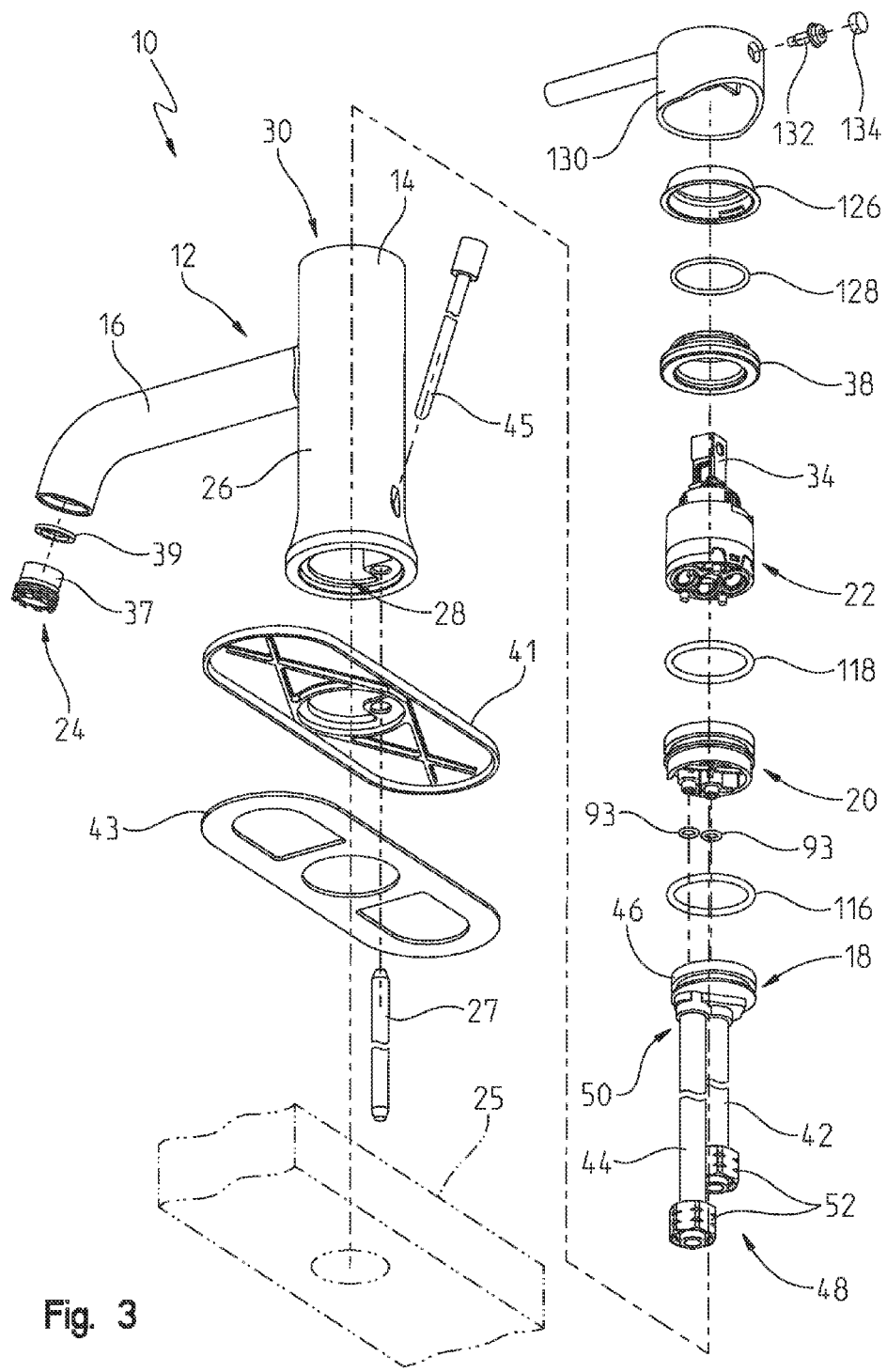
FIG. 3 is a bottom exploded perspective view of the faucet of FIG. 1.
Figure 4:
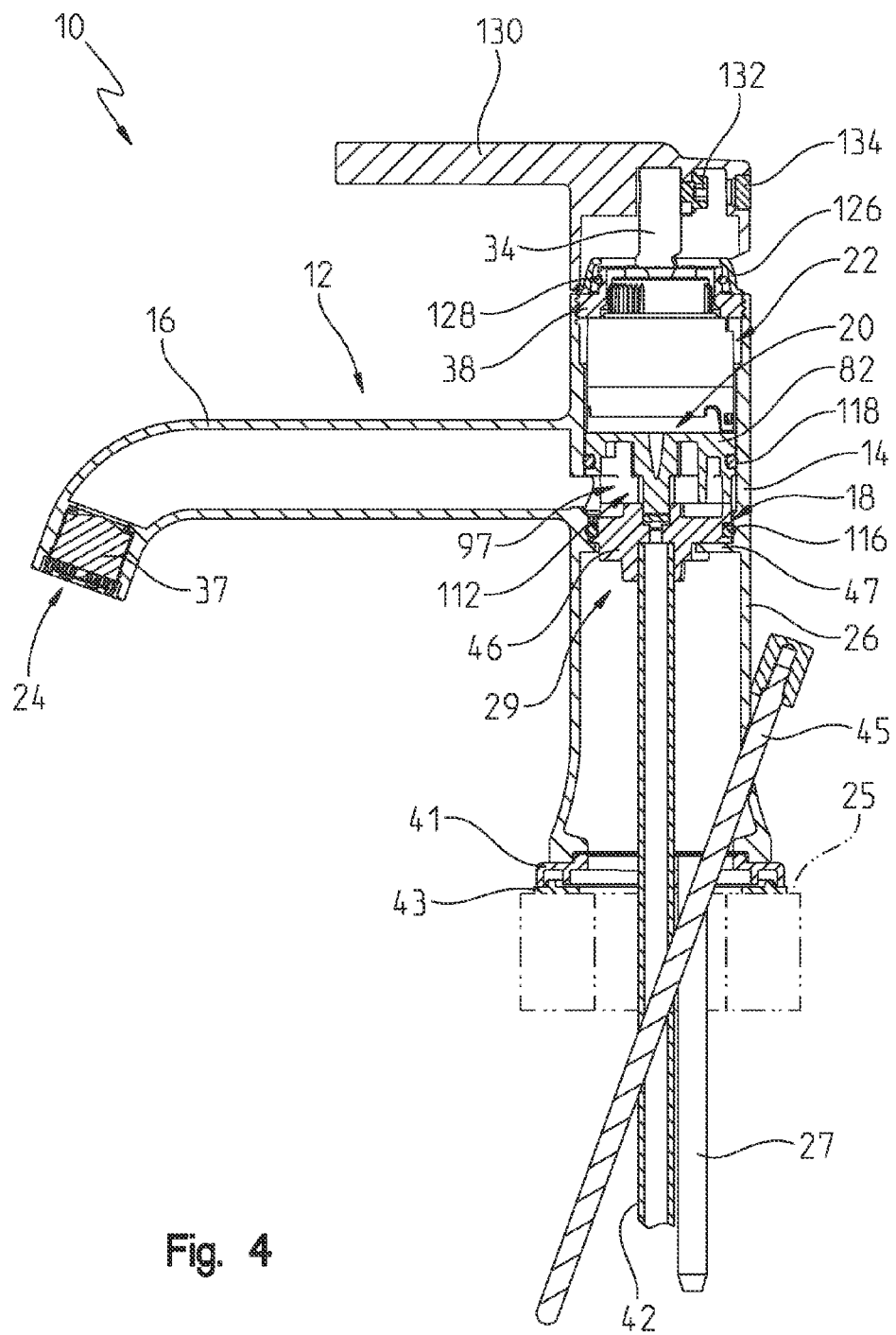
FIG. 4 is a cross-sectional view of the faucet of FIG. 1, taken along line 4-4 of FIG. 1.

With further reference to FIGS. 2-4, the illustrative waterway assembly 18 of faucet 10 includes hot water inlet tube 42, cold water inlet tube 44, and a coupler, illustratively a lower wall or base 46. The lower wall 46 is received within the cylindrical sidewall 26 of the hub portion 14. More particularly, the lower wall 46 is inserted from the open upper end 30 of the hub portion 14 and is supported on a lip or ledge 47 in stepped chamber 29 of the hub portion 14.

Hot and cold water inlet tubes 42 and 44 of waterway assembly 18 may be fluidly coupled to the hot and cold water supplies (not shown), respectively, for receiving water into the faucet 10. Each tube 42 and 44 extends between a first or lower end 48 and an opposing second or upper end 50.

As shown in FIG. 1, the first end 48 of each water inlet tube 42, 44 extends freely beneath hub portion 14 of the spout assembly 12. First ends 48 of the hot and cold water inlet tubes 42 and 44 may include conventional fluid couplings 52, such as ferrules and nuts, for fluidly coupling the hot and cold water inlet tubes 42 and 44 onto hot and cold water supplies, such as conventional hot and cold water stops, respectively.

The second end 50 of each tube 42, 44 is illustratively received within the hub portion 14 of the spout assembly 12. The coupler or lower wall 46 is illustratively disc or puck shaped and surrounds and supports the tubes 42 and 44, specifically second ends 50 of the tubes 42 and 44, as shown in FIG. 2. In this arrangement, first ends 48 of the tubes 42 and 44 hang freely beneath the lower wall 46.

Figure 5:
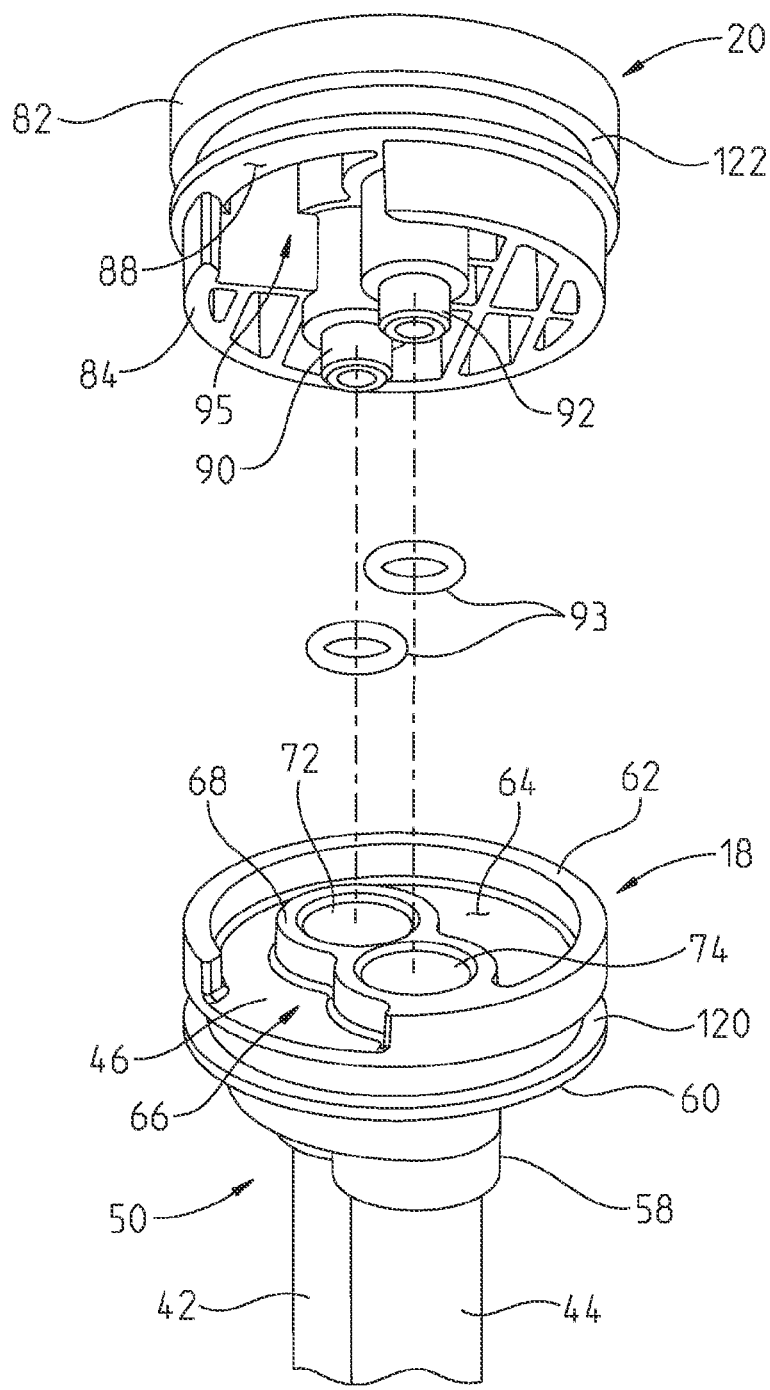
FIG. 5 is an exploded perspective view showing interaction between the lower waterway assembly and the upper waterway adapter.

With reference to FIG. 5, a boss 58 extends downwardly from a lower surface 60 of the lower wall 46 and provides support for the second ends 50 of the tubes 42 and 44. An arcuate wall 62 extends upwardly from an upper surface 64 of the lower wall 46 around the periphery thereof. An opening 66 is formed within the arcuate wall 62. A boss 68 is illustratively formed with the arcuate wall 62 and defines an upwardly facing hot water receiving bore 72 and an upwardly facing cold water receiving bore 74. Both receiving bores 72 and 74 extend through the lower wall 46 from the upper surface 64 through the lower surface 60.

To reduce contact between water in the faucet 10 and metallic components, waterway assembly 18 may be formed of a flexible, non-metallic material, such as a polymer, illustratively a cross-linkable polymer. As such, the waterway assembly 18 is illustratively electrically non-conductive. In one illustrative embodiment, substantially the entire waterway assembly 18 is formed of a polyethylene which is subsequently cross-linked to form cross-linked polyethylene (PEX). Other suitable materials that may be used to construct waterway assembly 18 include polyethylene (PE) (such as raised temperature resistant polyethylene (PE-RT)), polypropylene (PP) (such as polypropylene random (PPR)), and polybutylene (PB). It is further envisioned that waterway assembly 18 may be constructed of cross-linked polyvinylchloride (PVCX) using silene free radical initiators, cross-linked polyurethane, or cross-linked propylene (XLPP) using peroxide or silene free radical initiators. It is within the scope of the present disclosure that the polymer material used to construct waterway assembly 18 may include reinforcing members, such as glass fibers. In one illustrative embodiment, the waterway assembly 18 is formed from OT 30GF polyethylene with is cross-linked subsequent to overmolding.

Waterway assembly 18 may be constructed by the methods set forth in U.S. Pat. No. 7,766,043, entitled "Faucet including a Molded Waterway Assembly", and in PCT International Patent Application Publication No. WO 2010/099397, filed Feb. 26, 2010, entitled "Faucet Manifold" the disclosures of which are expressly incorporated by reference herein.

To further limit contact between water and faucet and metallic components, and to provide an improved sealing surface with the valve assembly 22, waterway adapter 20 may be formed of a non-metallic material, such as a polymer having a hardness greater than that of the waterway assembly 18. In one illustrative embodiment, waterway adapter 20 is formed of a glass fiber reinforced polysulfone (PSU), such as UDEL™ GF-110, available from Solvay Advanced Polymers of Alpharetta, Ga. In another illustrative embodiment, waterway adapter 20 is formed of a polyethylene, which may be subsequently cross-linked to form a cross-linkable polyethylene (PEX). Other suitable materials that may be used to construct waterway adapter 20 include polyethylene (PE) (such as raised temperature resistant polyethylene (PE-RT)), polypropylene (PP) (such as polypropylene random (PPR)), and polybutylene (PB). It is further envisioned the waterway adapter 20 may be constructed of cross-linked polyvinyl chloride (PVCX) using silene free radical initiators, cross-linked polyurethane, or cross-linked propylene (XLPP) using peroxide or silene free radical initiators. It is within the scope of the present disclosure that the polymer material used to construct waterway adapter may include reinforcing members, such as glass fibers.

Figure 6:
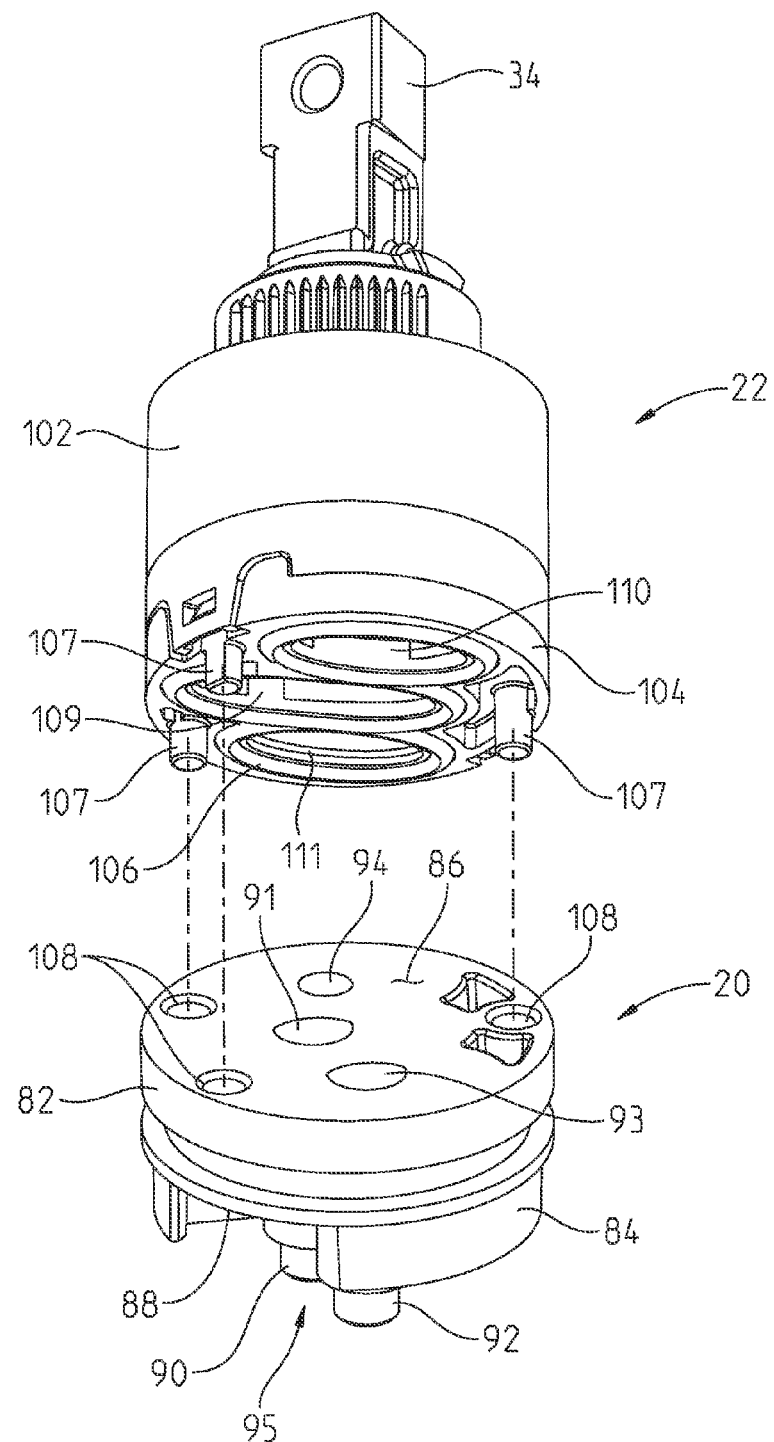
FIG. 6 is an exploded perspective view showing interaction between the valve assembly and the waterway adapter.
Figure 7A:
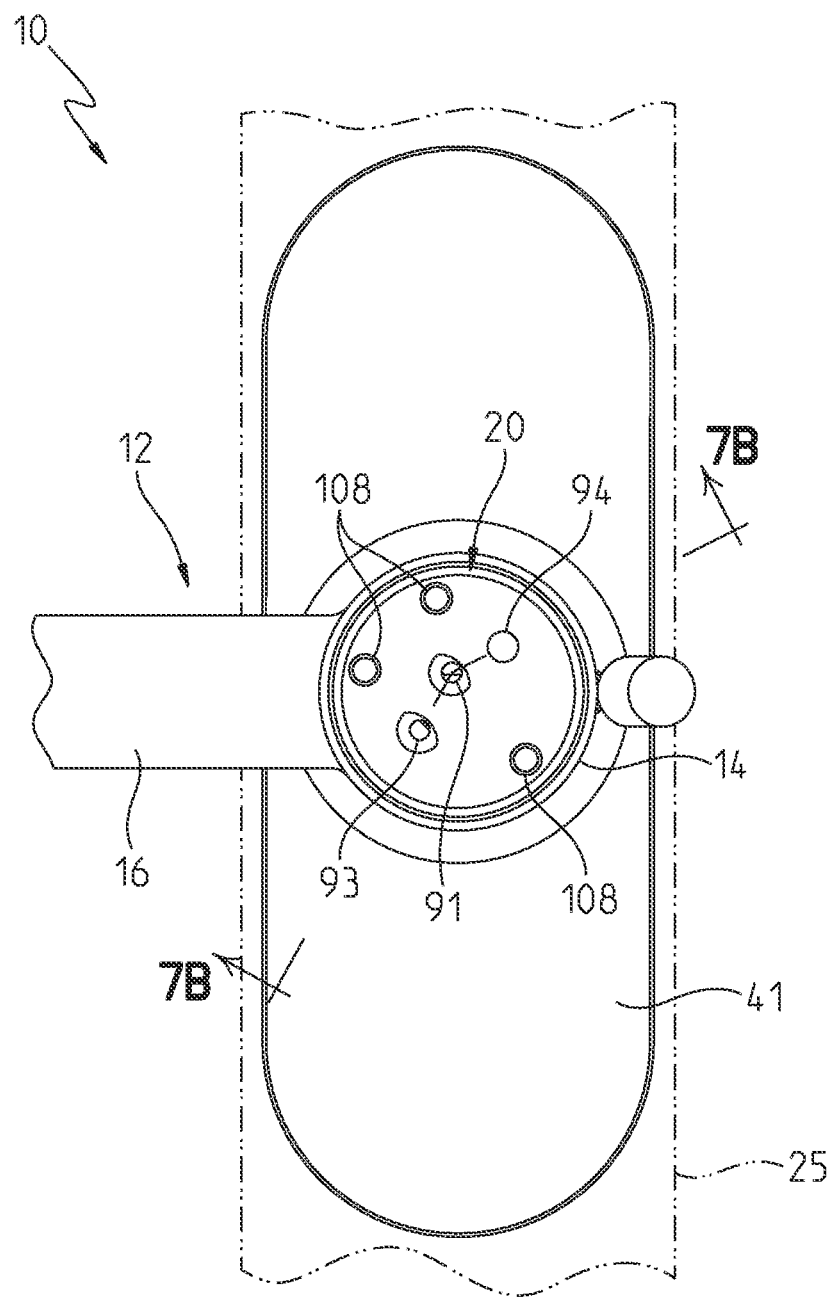
FIG. 7A is a top plan view of the faucet of FIG. 1, with the valve assembly removed for clarity.
Figure 7B:
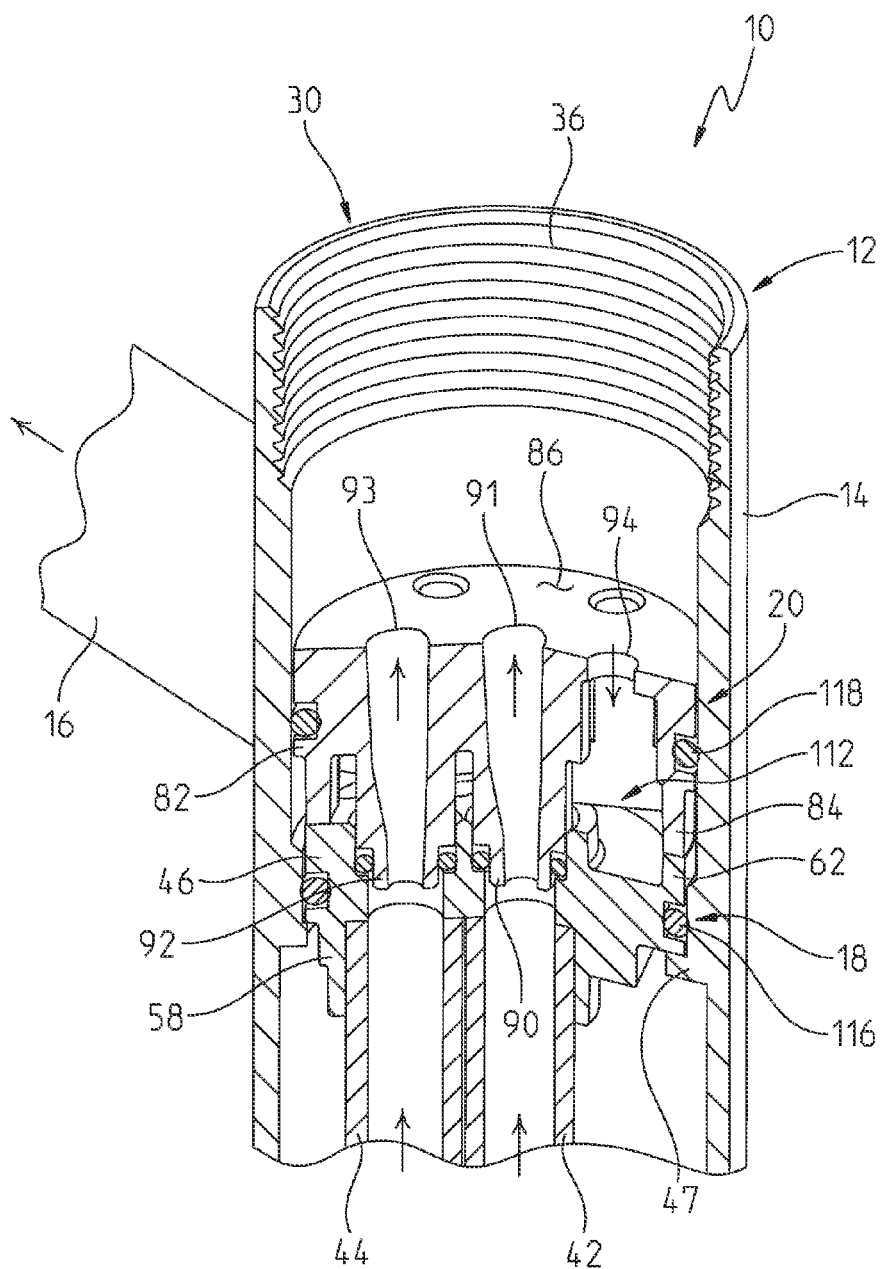
FIG. 7B is a cross-sectional view taken along line 7B-7B of FIG. 7A.

With reference to FIGS. 5 and 6, the illustrative waterway adapter 20 includes an upper wall 82 and a downwardly extending annular wall or skirt 84. The upper wall 82 includes an upper surface 86 and a lower surface 88, with downwardly extending tubular projections 90 and 92 extending downwardly from the lower surface 88. The downwardly extending projections 90 and 92 are receivable within the receiving bores 72 and 74 formed in the lower wall 46 of the waterway assembly 18. More particularly, downwardly extending hot water tubular projection 90 is received within hot water receiving bore 72 and includes a fluid passageway 91 to provide a fluid coupling therewith. Similarly, downwardly extending cold water tubular projection 92 is received within cold water receiving bore 74 and includes a fluid passageway 93 to provide a fluid coupling therewith. Elastomeric o-rings 93 are received over the projections 90 and 92 and provide fluid seals with the waterway assembly 18.

An outlet passageway 94 extends through the upper wall 82 of the waterway adapter 20 from the upper surface 86 to the lower surface 88. An opening 95 is formed within the arcuate skirt 84 and is illustratively aligned with the opening 66 of the arcuate wall 62 of the waterway assembly 18. Together, the openings 66 and 95 define a waterway opening 97 in fluid communication with the spout outlet portion 16 of the spout assembly 12 (FIG. 4).

The upper surface 86 of the upper wall 82 defines a seat to sealingly engage with the valve assembly 22. More particularly, the valve assembly 22 includes valve body 102 having a lower housing 104 having a face seal or gasket 106 supported thereon. The valve body 102 may receive a stationary lower disc, a moveable upper disc (not shown), and valve stem 34 operably coupled to the upper disc for operation thereof for controlling water flow through hot water and cold water inlet tubes 42 and 44. Moreover, the valve assembly 22 may be of conventional design for mixing water from the hot and cold water inlet tubes 42 and 44 and supplying mixed outlet water to spout outlet 24. The lower housing 104 includes a hot water inlet port 109 in fluid communication with the hot water tubular projection 90 of the adapter 20, a cold water inlet port 110 in fluid communication with the cold water tubular projection 92 of the adapter 20, and an outlet water port 111 in fluid communication with the outlet passageway 94 of the adapter 20. Additional details of an illustrative mixing valve assembly are provided in US Patent Application Publication No. 2012/0018009, entitled "Waterway Adapter", the disclosure of which is expressly incorporated by reference herein.

Locating elements, such as pegs 107, extend downwardly from the valve body 102 to assist with coupling the valve assembly 22 to the waterway adapter 20. For example, pegs 107 may extend from lower housing 104 of valve body 102 and into corresponding holes 108 of the waterway adapter 20. The positioning of each peg 107 of valve body 102 within a corresponding hole 108 of waterway adapter 20 may facilitate proper orientation of the valve assembly 22 relative to the waterway adapter 20 and, as a result, proper orientation of valve assembly 22 relative to the waterway assembly 18.

A fluid or waterway chamber 112 is defined longitudinally (i.e., vertically) between the upper wall of the waterway assembly 18 and the lower wall of the adapter 20, and laterally (i.e., horizontally) between the arcuate wall of the waterway assembly 18 and the skirt of the adapter 20. Waterway opening 97 is defined intermediate the waterway adapter 20 and the waterway assembly 18, and is in fluid communication with the spout outlet 24. In the embodiment shown in FIGS. 1-7B, the outlet portion 16 of the spout assembly 12 is generally level with the fluid chamber 112. The valve assembly 22 is configured to control water flow through the hot water inlet tube 42 and the cold water inlet tube 44 to the spout outlet 24.

An outer lower radial seal, illustratively an elastomeric o-ring 116, is supported by the waterway assembly 18. Similarly, an outer upper radial seal, illustratively an elastomeric o-ring 118, is supported by the adapter. More particularly, o-ring 116 is received within an annular groove 120 of the lower wall 46, and seals between an outer surface of the lower wall 46 and an inner surface of the hub portion 14. O-ring 118 is received within an annular groove 122 of the upper wall 82, and seals between an outer surface of the upper wall 82 and an inner surface of the hub portion 14.

During assembly, the waterway assembly 18 and waterway adapter 20 are inserted from the upper open end 30 of the hub portion 14 into the stepped chamber 29 until the lower wall 46 of the waterway assembly 18 rests on the support lip 47. Illustratively, the diameter of the lower wall 46 of the waterway assembly 18 is less than the diameter of the upper wall 82 of the adapter 20 to facilitate sliding insertion of these components into the stepped chamber 29 and prevent inadvertent catching or snagging on stepped surfaces or lips.

A bonnet cap 126, illustratively formed of a metal plated thermoplastic, is received over the bonnet nut 38. An elastomeric o-ring 128 retains the bonnet cap 126 on the bonnet nut 38. A handle 130 is coupled to the valve stem 34 for manipulation by a user and subsequent control of the valve assembly 22. A set screw 132 secures the handle 130 to the valve stem 34, while an elastomeric button or plug 134 covers the set screw 132.

With reference now to FIGS. 8-17, a further illustrative faucet 210 is shown. The faucet 210 includes many of the same components identified above with faucet 10. As such, similar components will be identified with like reference numbers.

Faucet 210 includes a spout assembly 212 including a hub portion 214 with a substantially rectangular traverse cross-section. Additionally, an outlet portion 216 of the spout assembly 212 is elevated on the hub portion 214 compared to the faucet 10.

As shown in FIGS. 14 and 15, the hub portion 214 includes a rectangular side wall 218 defining inner corners 220 and outer corners 222. The outlet portion 216 of the spout assembly is supported above the fluid chamber 112 defined between the waterway assembly 18 and the waterway adapter 20 of the faucet 210. In order to provide fluid communication between the fluid chamber 112 and the outlet portion 216, bores 224 are formed within the casting of the spout assembly. More particularly, bores 224 are formed (e.g., through casting of the spout assembly 212 or subsequent machining thereof) within the inner corners 220 of the hub portion 214. The bores 224 provide fluid communication between the fluid chamber 112 and the outlet portion 216 of the spout assembly 212.

A flow straightener 226 defines the spout outlet 24 and is secured to the outlet portion 216 through a set screw 228. A separate flow regulator 230 and cooperating o-ring 236 are illustratively supported by the waterway adapter 20' and are configured to restrict water flow. A brass seat 232 and elastomeric o-ring 234 secures the flow regulator 230 within the upper surface of the upper wall 82' of the adapter 20'. Connector 238 is secured to the valve stem 34' by a screw 240 and provides a locking interface with the handle 130 by cooperating with set screw 132.

The valve assembly 22' may be a conventional mixing valve. Illustratively, the valve assembly 22' comprises a Kerox K25 valve cartridge.

With reference now to FIGS. 18-25B, another illustrative embodiment faucet 310 is shown. The faucet 310 includes many of the same components identified above with faucet 10. As such, similar components will be identified with like reference numbers.

Figure 8:
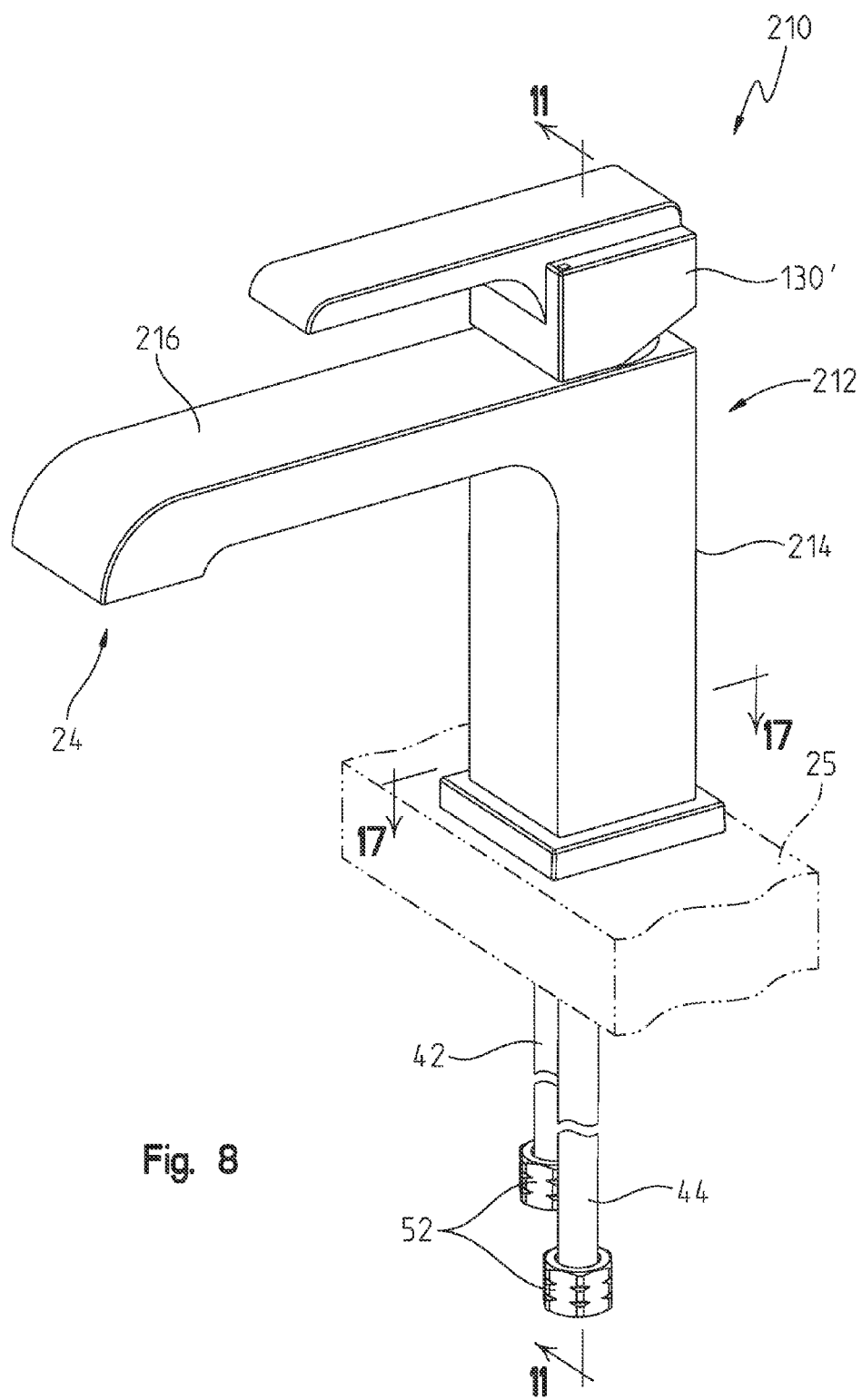
FIG. 8 is a perspective view of an illustrative embodiment faucet of the present disclosure mounted to a sink deck.
Figure 9:
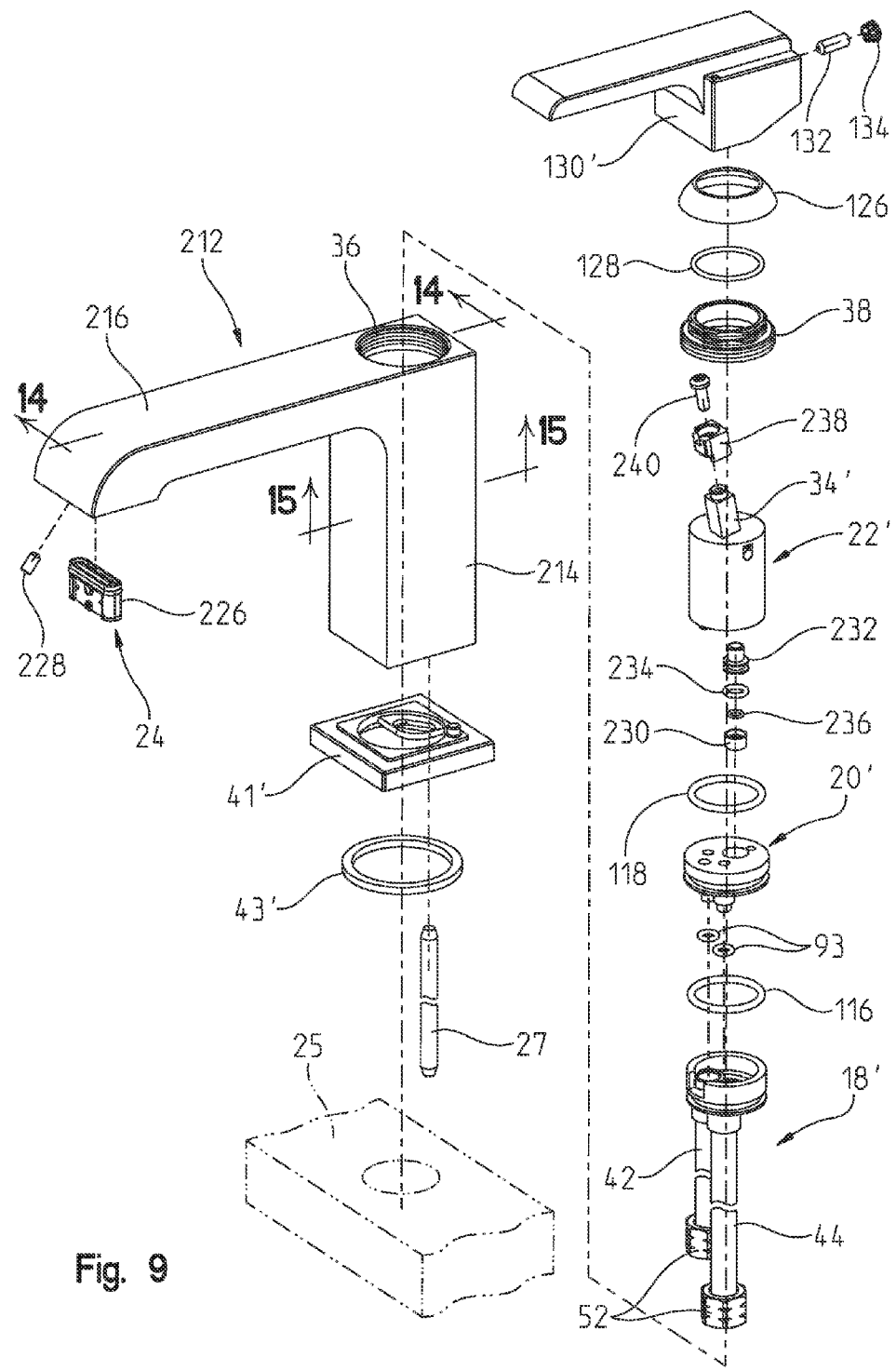
FIG. 9 is a top exploded perspective view of the faucet of FIG. 8.
Figure 10:
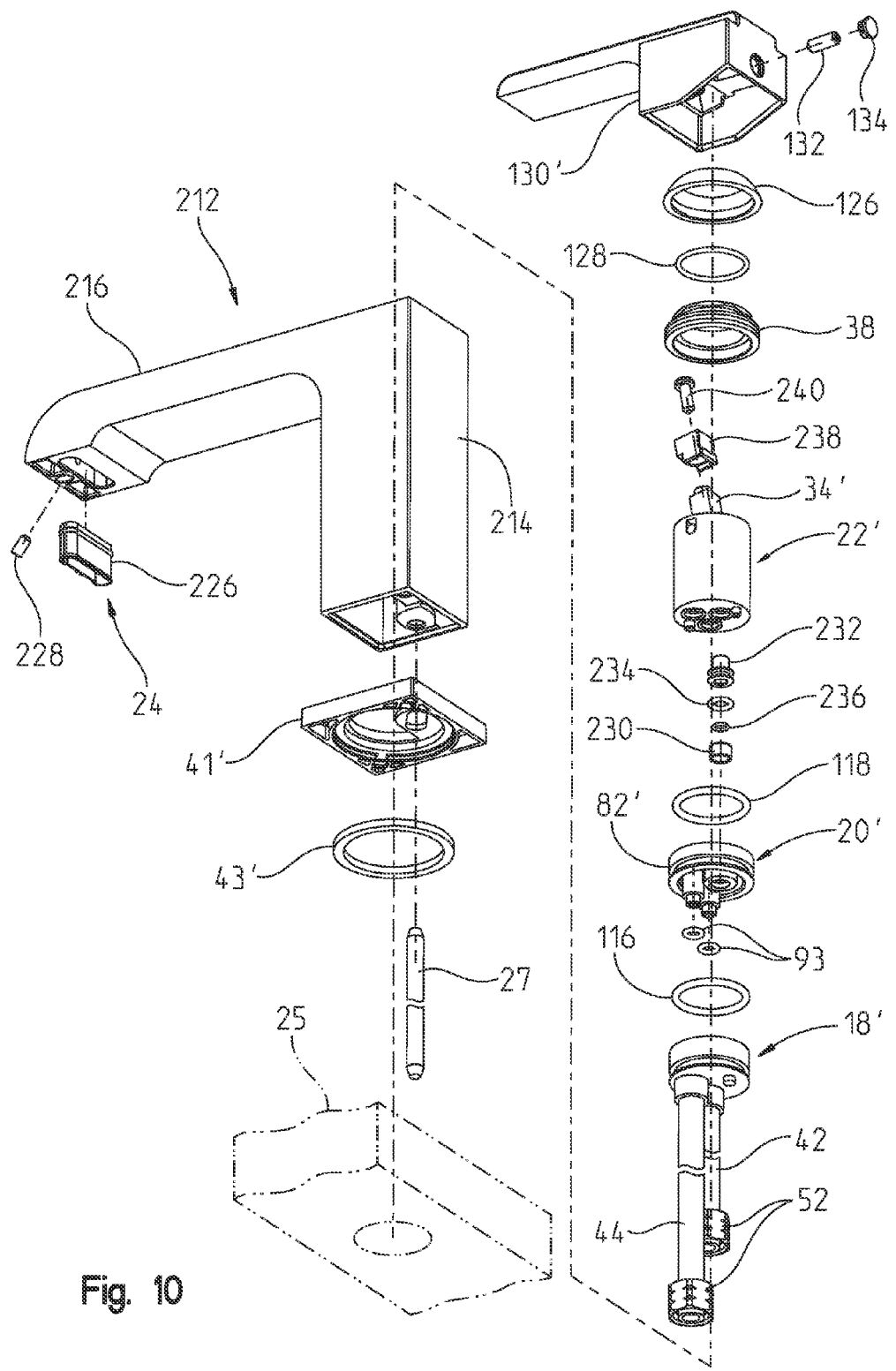
FIG. 10 is a bottom exploded perspective view of the faucet of FIG. 8.
Figure 11:
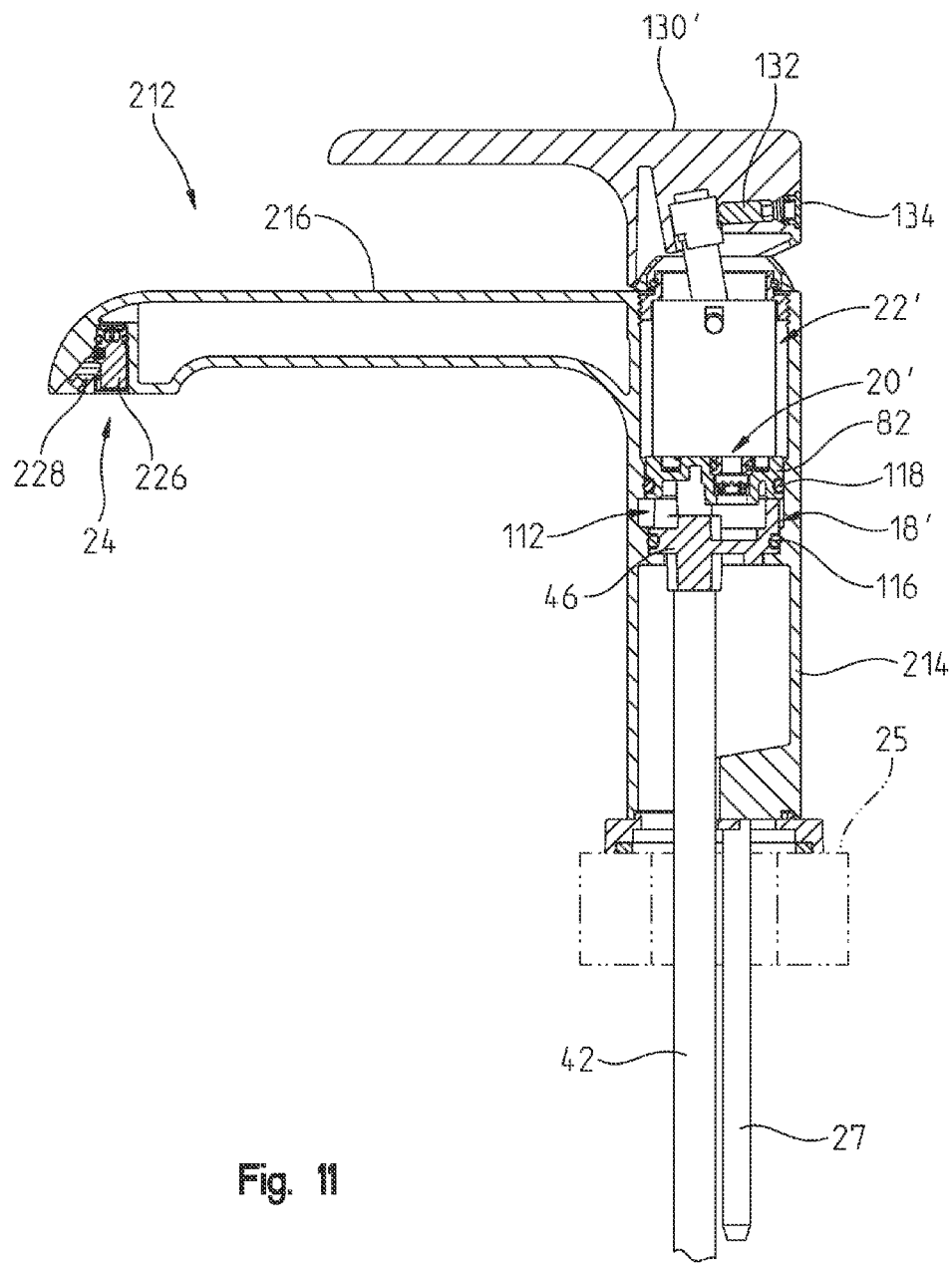
FIG. 11 is a cross-sectional view of the faucet of FIG. 8, taken along line 11-11.
Figure 12:
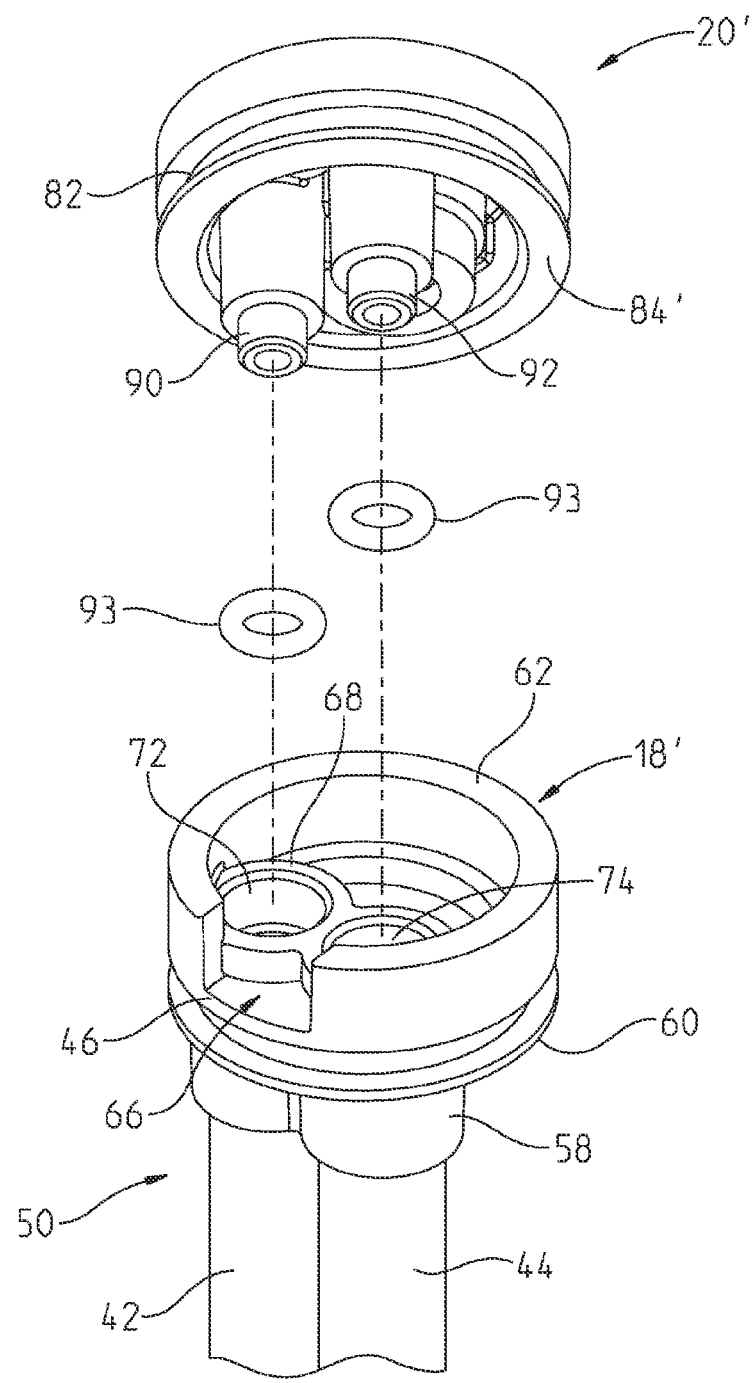
FIG. 12 is an exploded perspective view showing interaction between the lower waterway assembly and the upper waterway adapter.
Figure 13:
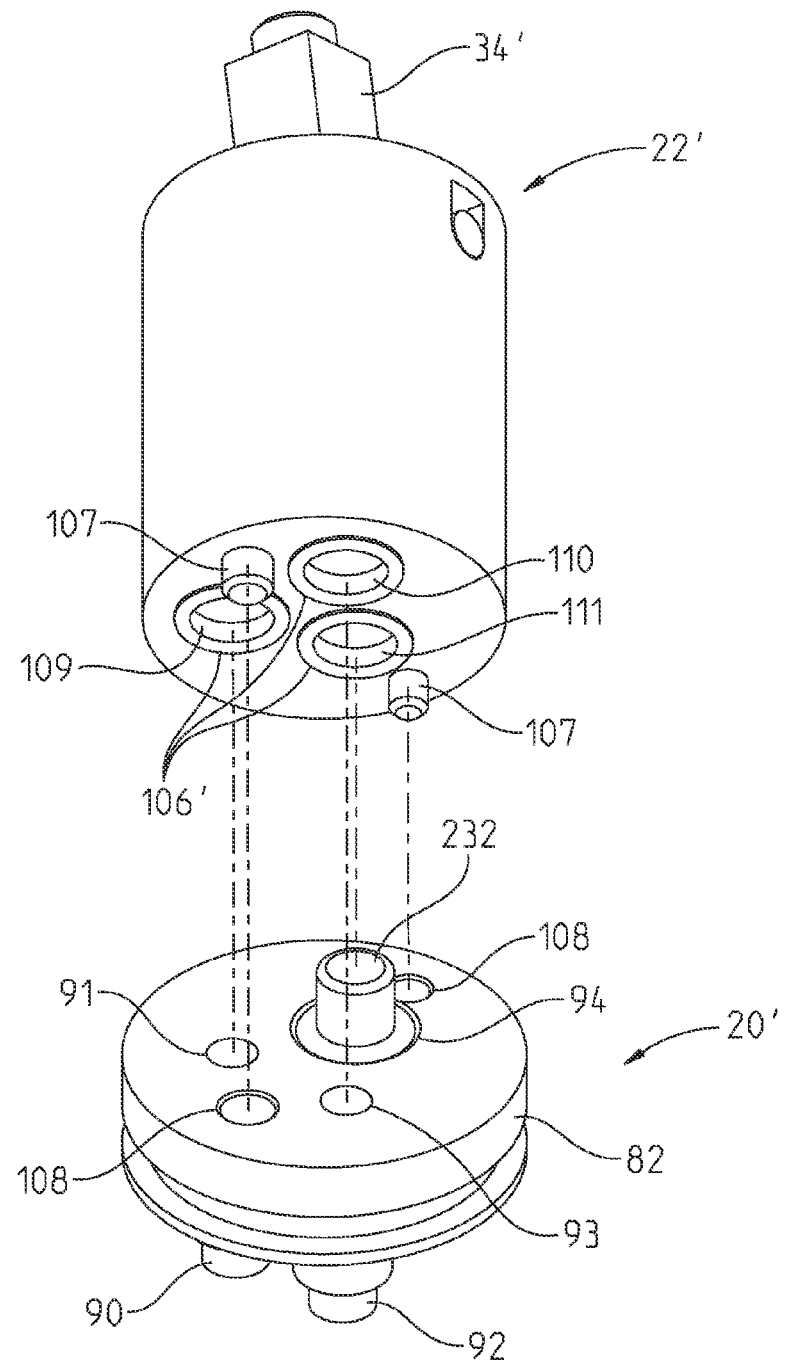
FIG. 13 is an exploded perspective view illustrating interface between the valve cartridge and the upper waterway adapter.
Figure 16A:
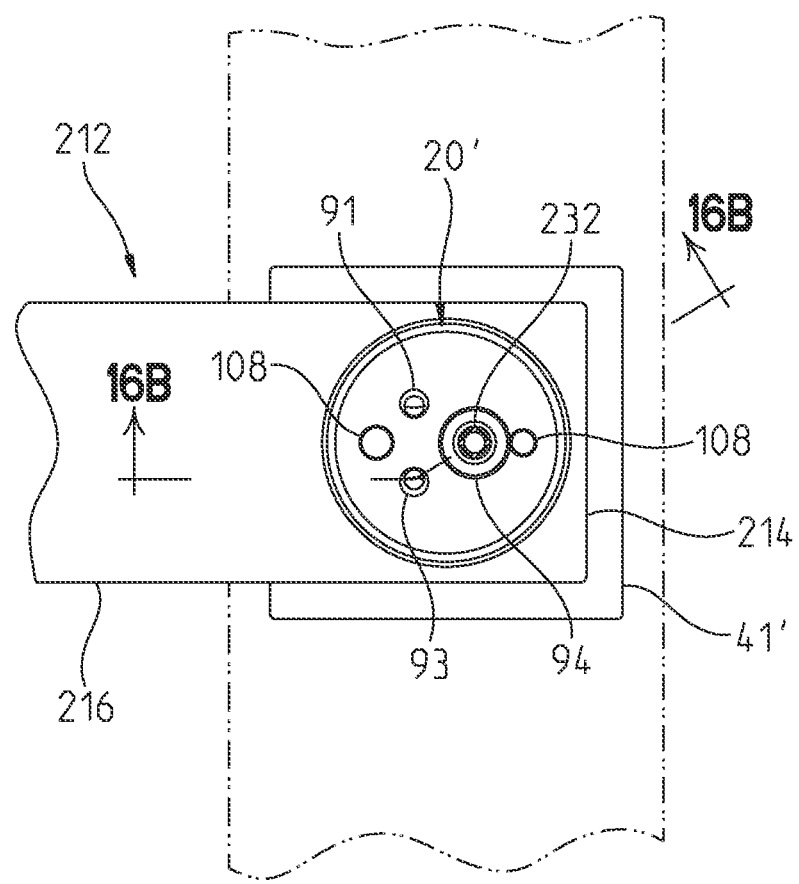
FIG. 16A is a top plan view of the faucet of FIG. 8, with the valve assembly removed for clarity.
Figure 16B:
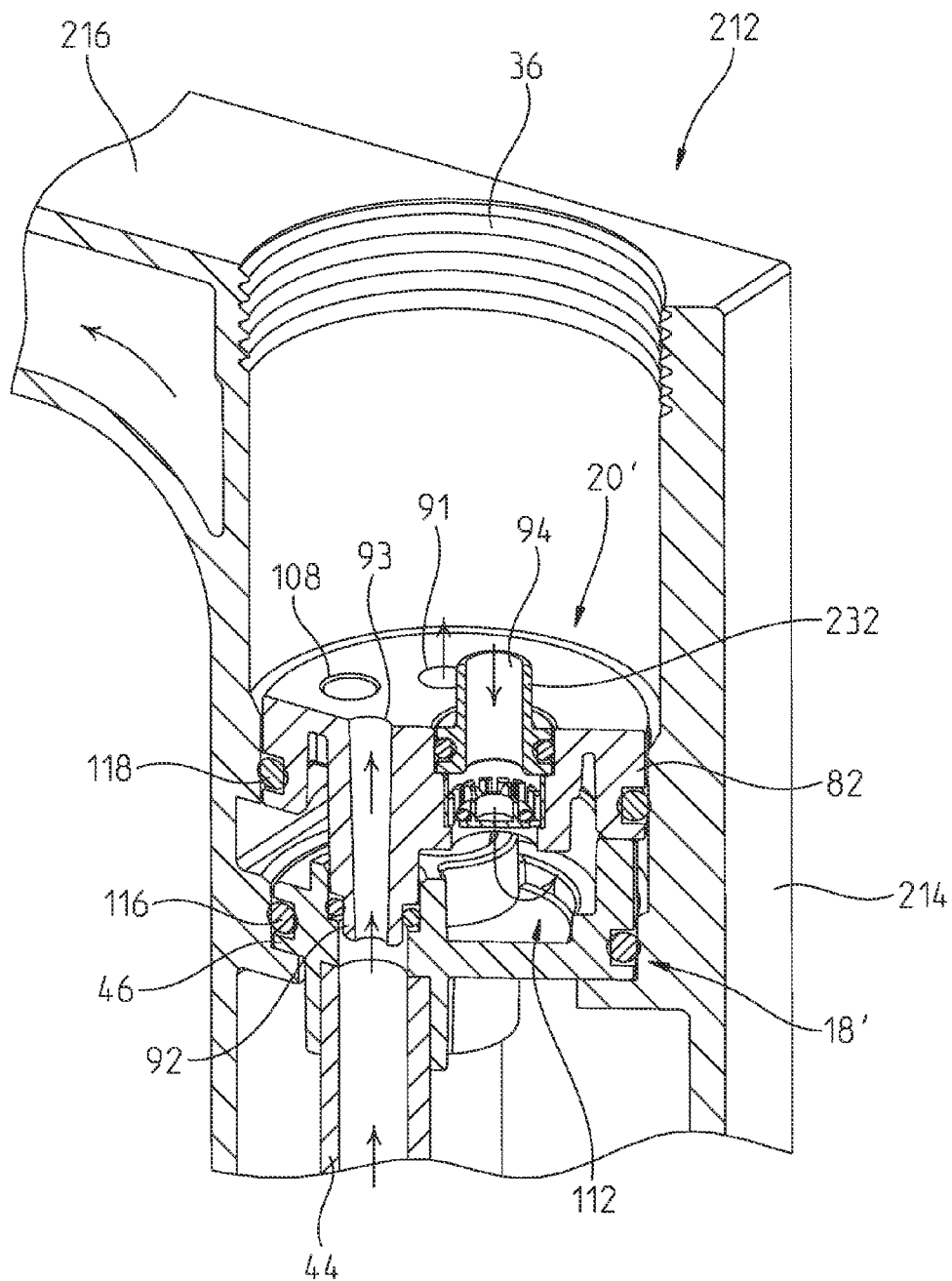
FIG. 16B is a cross-sectional view taken along line 16B-16B of FIG. 16A.
Figure 17:
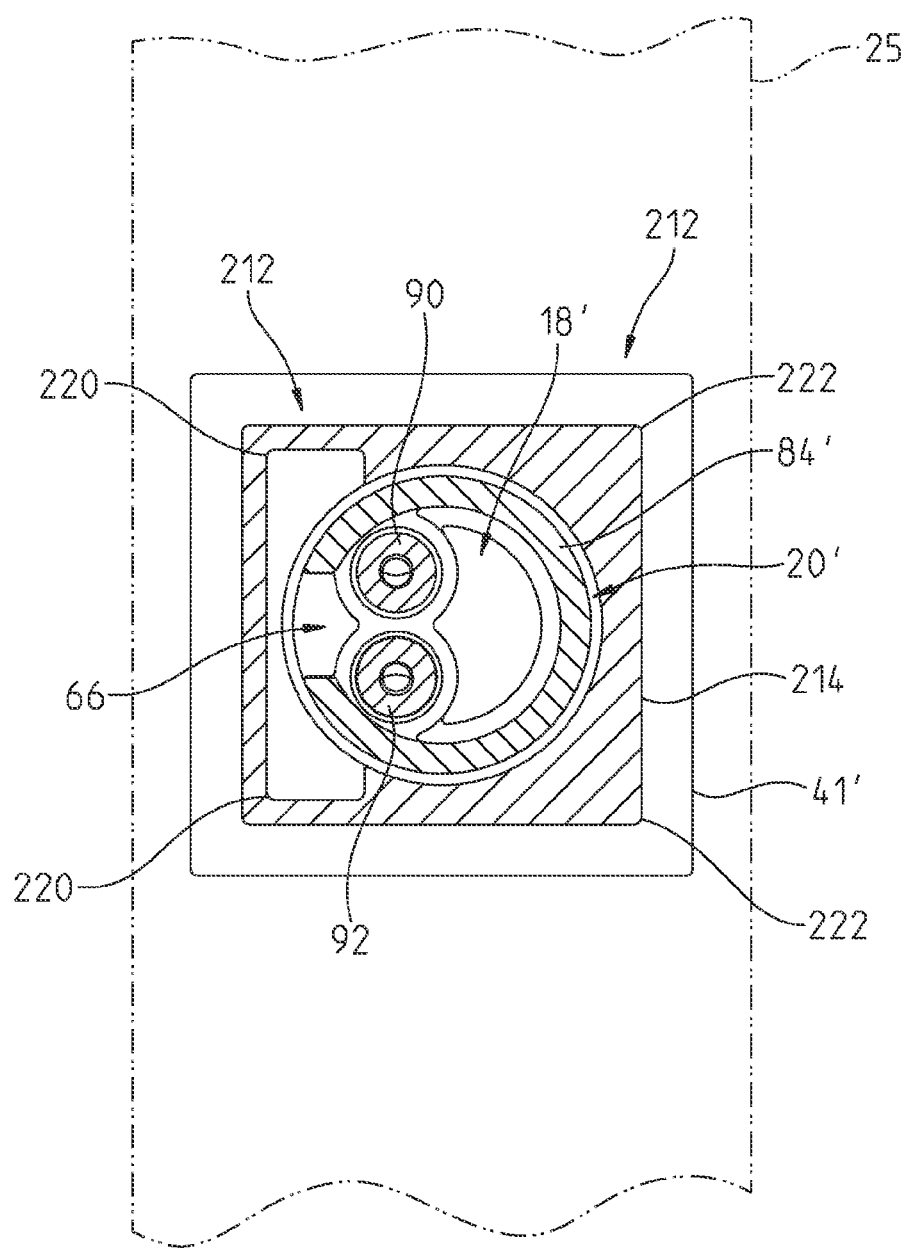
FIG. 17 is a cross-sectional view taken along line 17-17 of FIG. 8.
Figure 18:
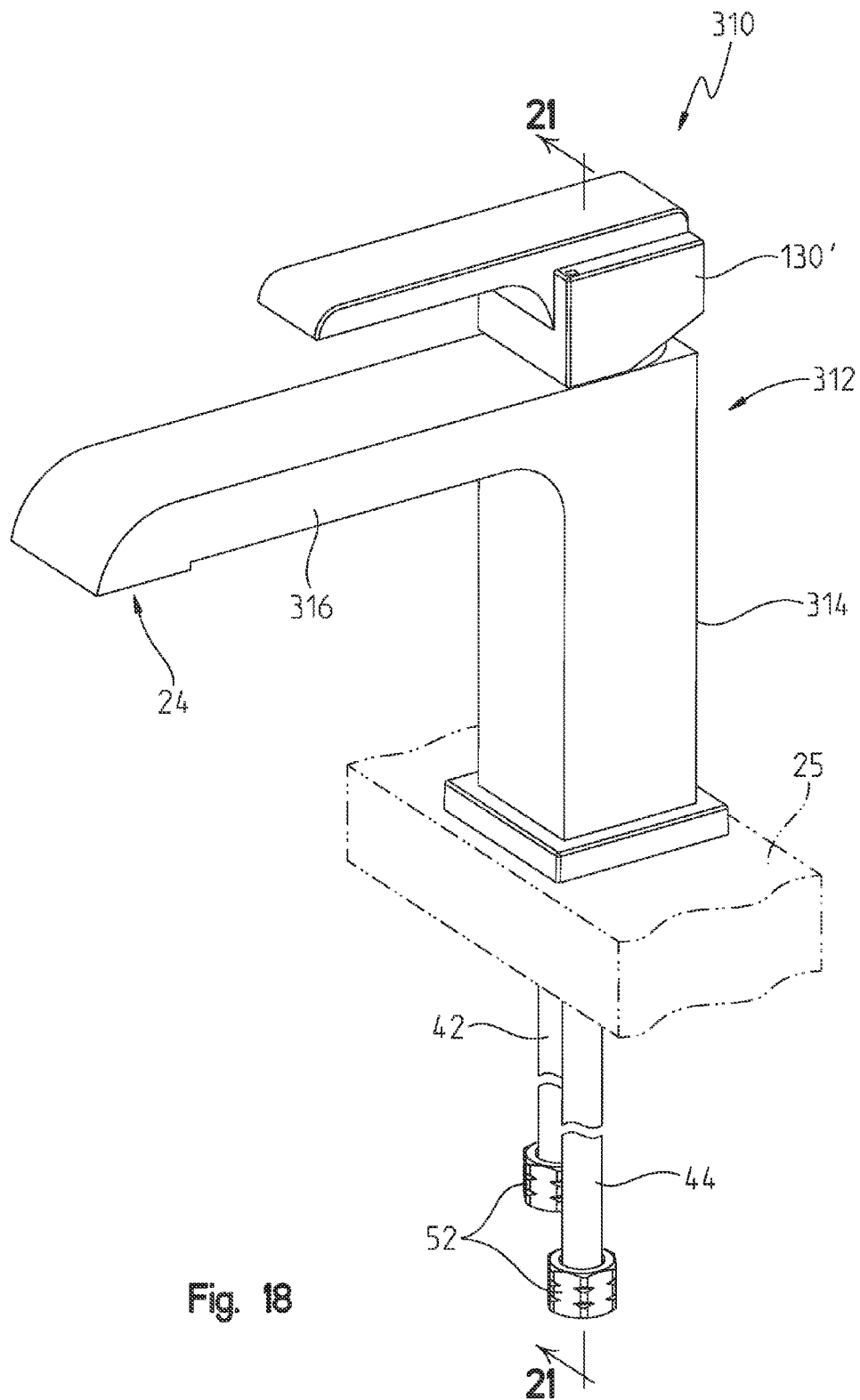
FIG. 18 is a perspective view of an illustrative embodiment faucet of present disclosure mounted to a sink deck.
Figure 19:
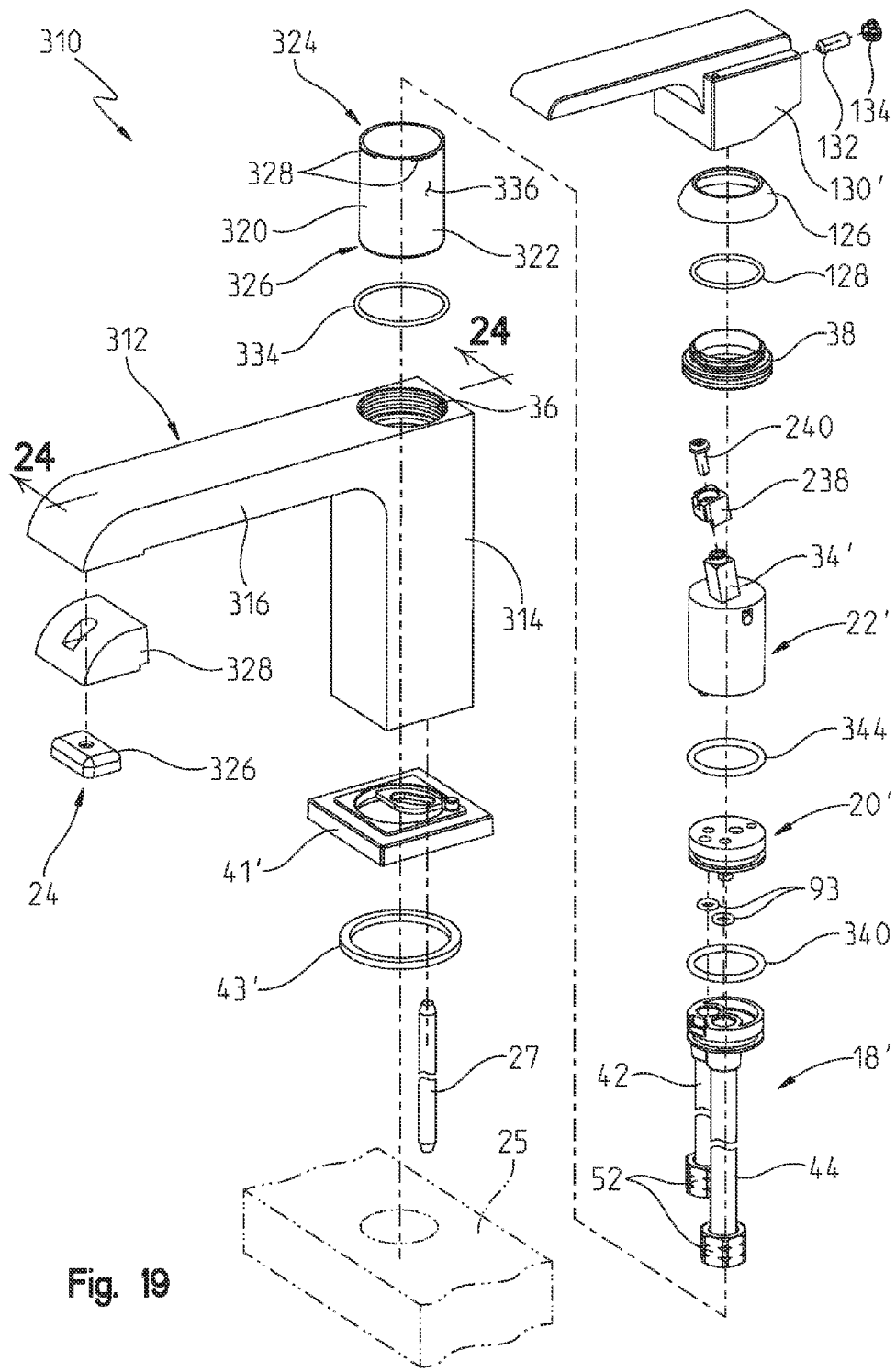
FIG. 19 is a top exploded perspective view of the faucet of FIG. 18.
Figure 20:
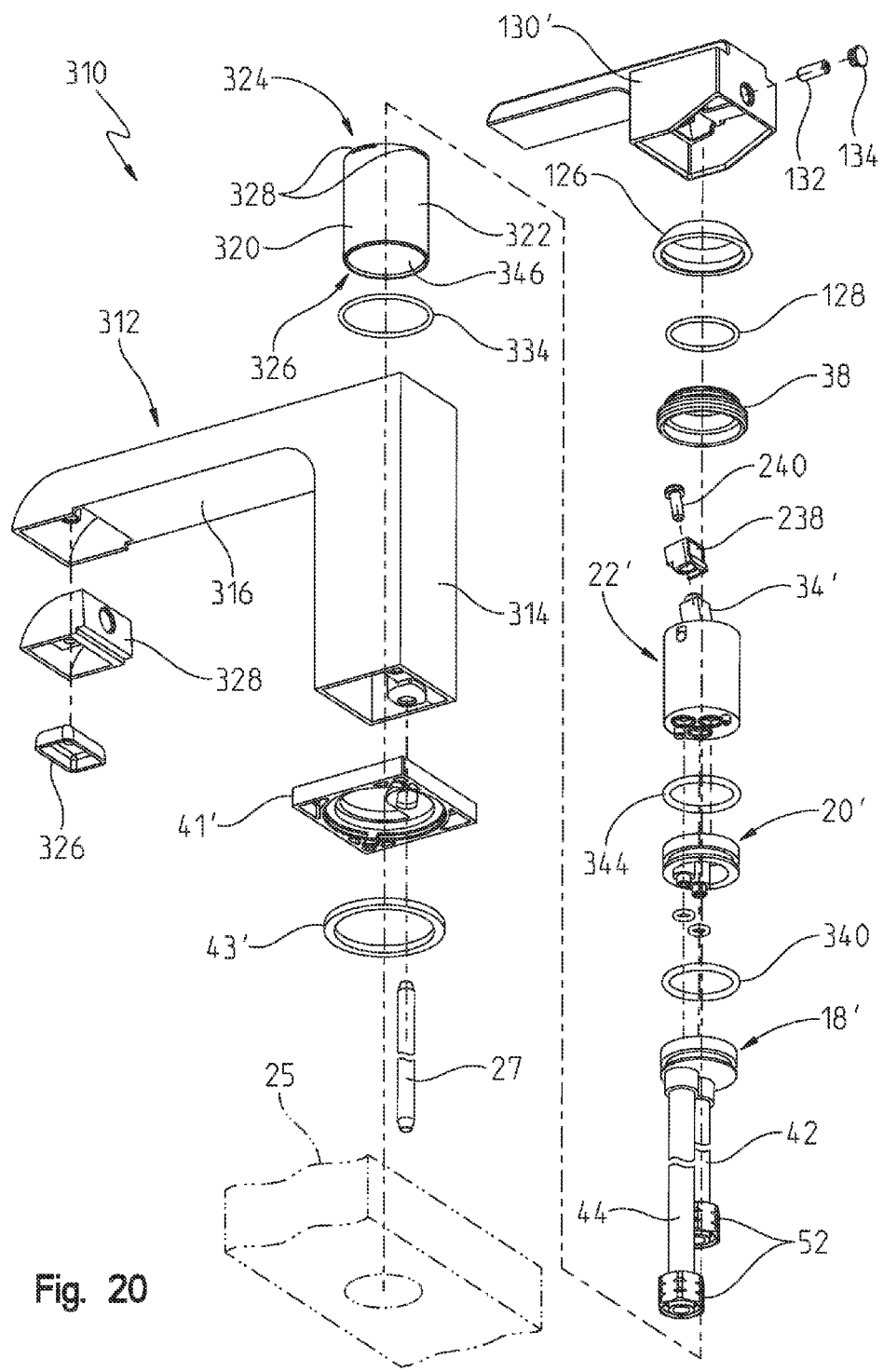
FIG. 20 is a bottom exploded perspective view of the faucet of FIG. 18.
Figure 21:
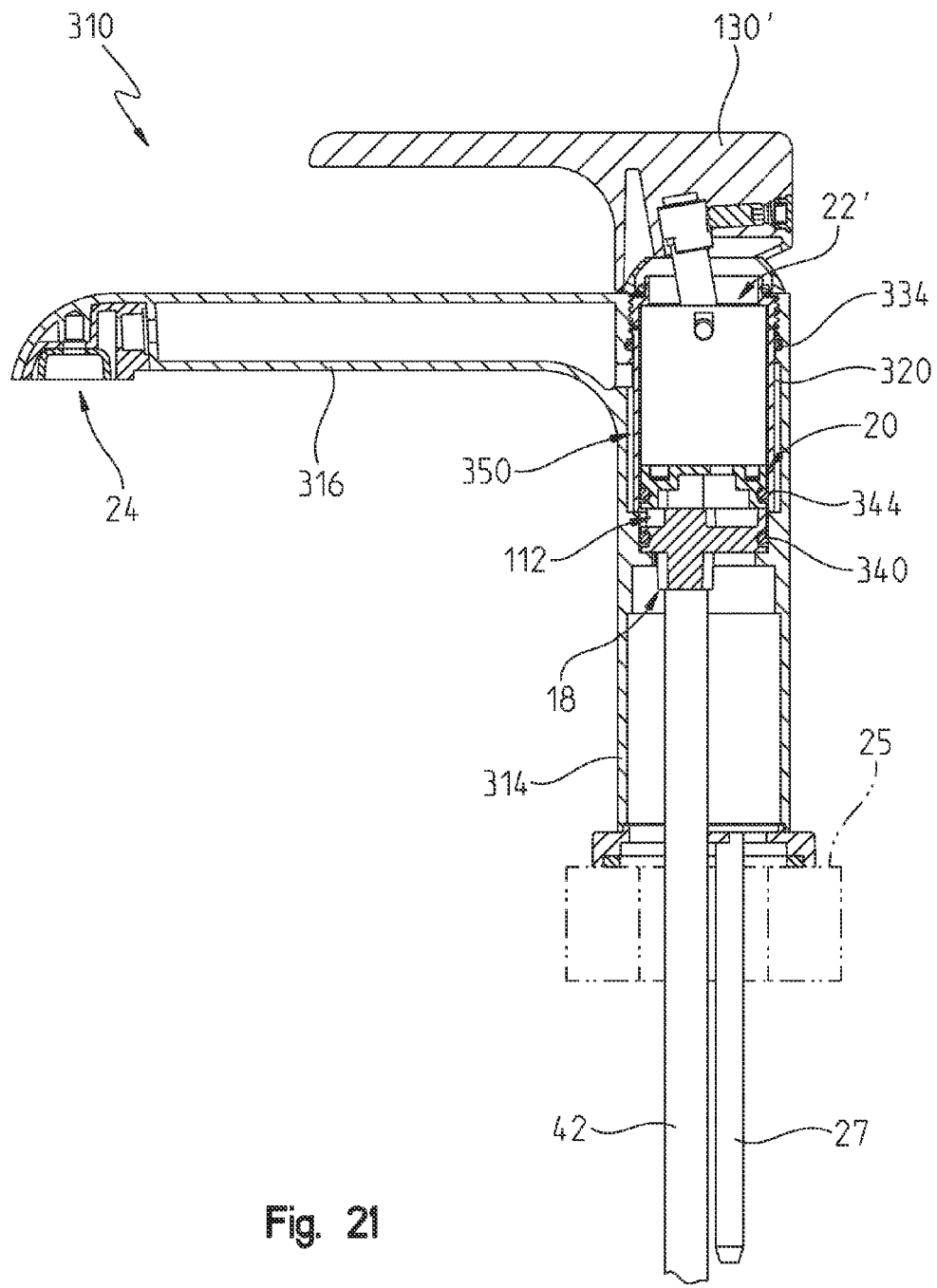
FIG. 21 is a cross-sectional view of the faucet of FIG. 18 taken along line 21-21.
Figure 22:
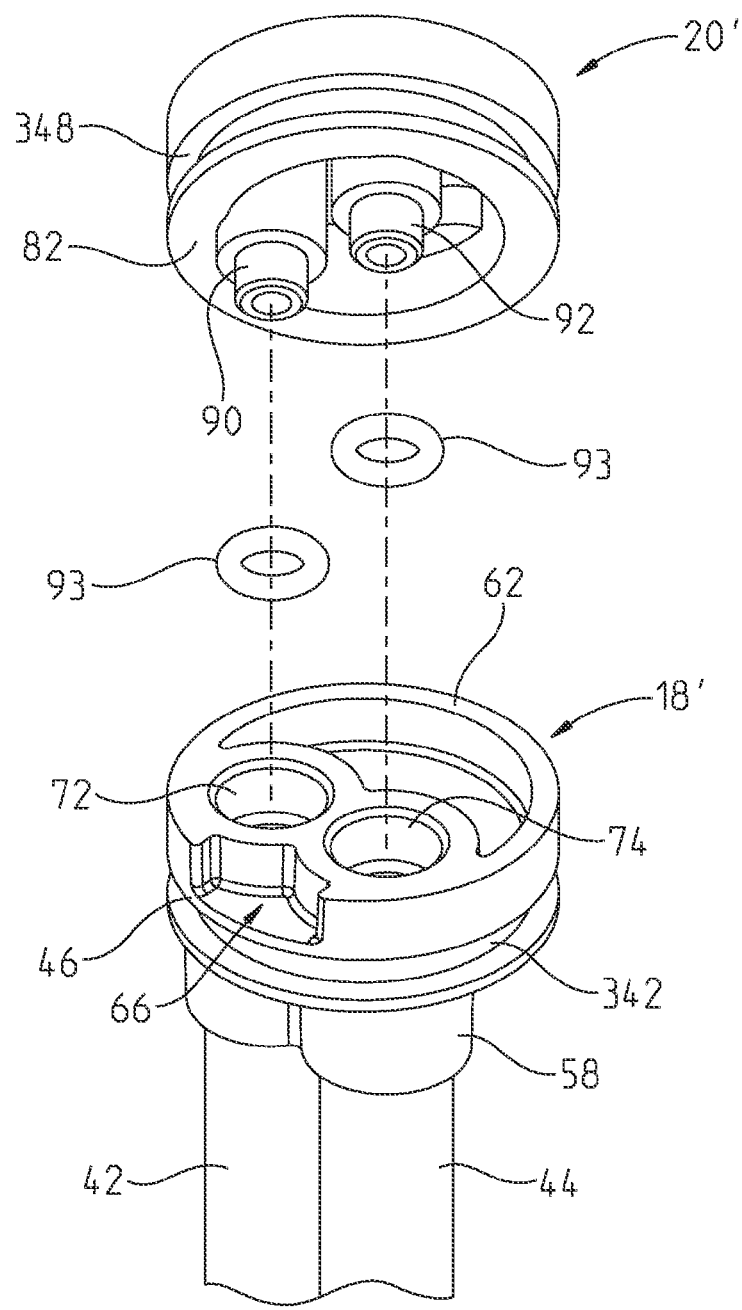
FIG. 22 is an exploded perspective view showing interaction between the lower waterway assembly and the upper waterway adapter.
Figure 23:
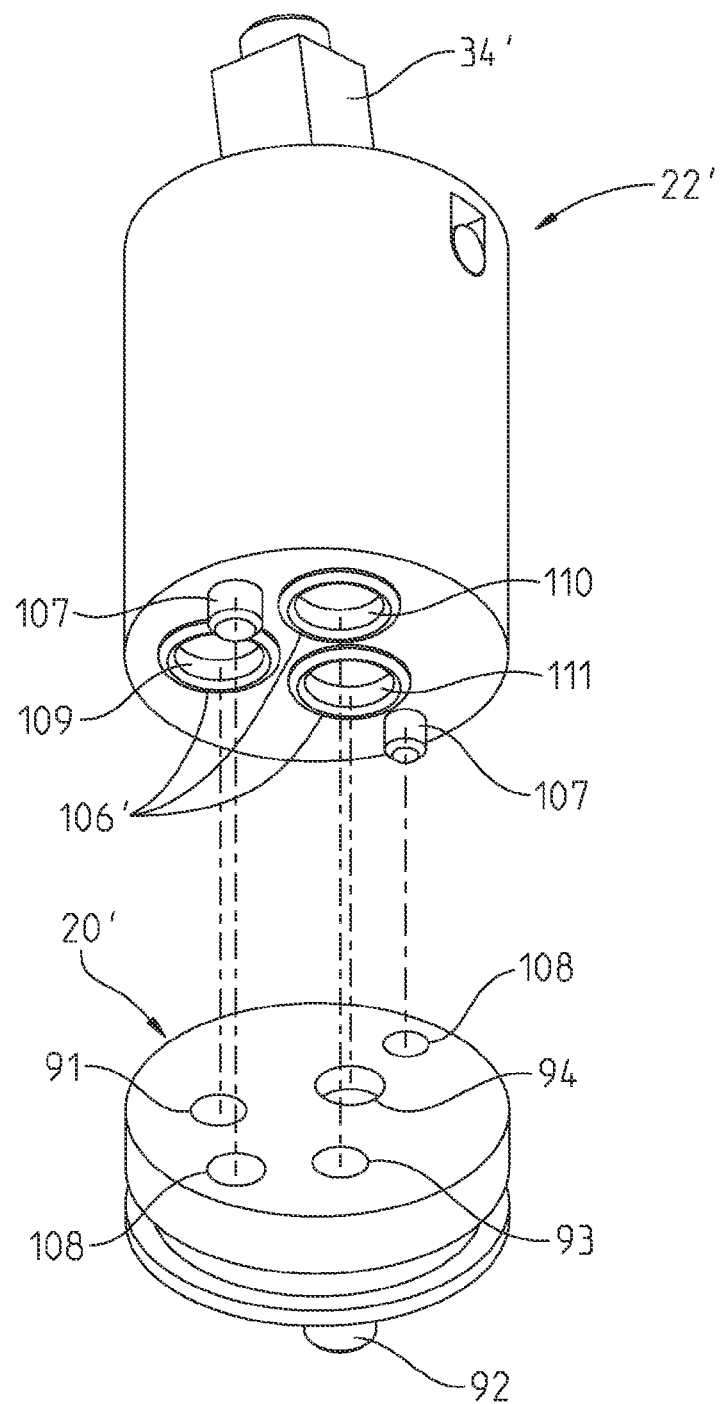
FIG. 23 is an exploded perspective view showing interaction between the valve assembly and the upper waterway adapter.

Similar to the faucet 210 of FIG. 8, faucet 310 includes a spout assembly 312 including a hub portion 314 with a substantially rectangular traverse cross-section. Additionally, an outlet portion 316 of the spout assembly 312 is elevated on the hub portion 314 compared to the faucet 10.

Figure 24:
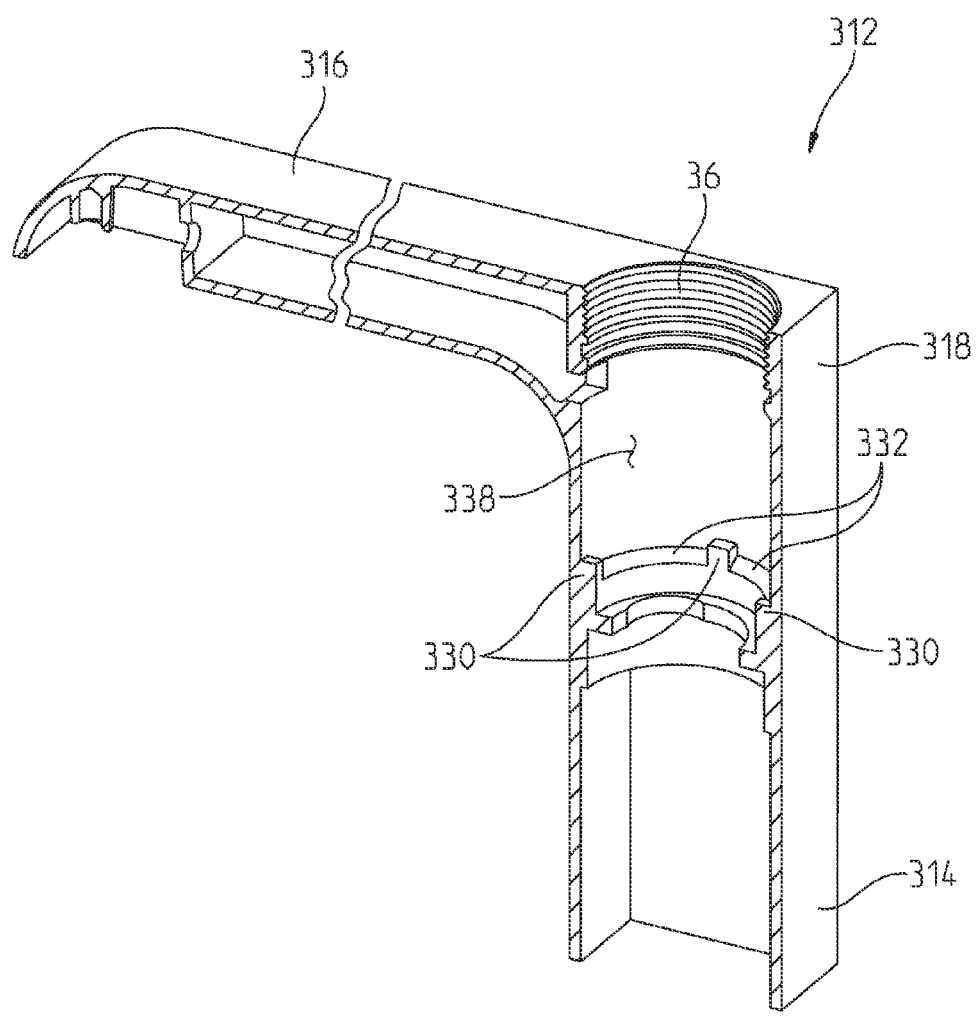
FIG. 24 is a perspective view of the spout assembly of FIG. 18, with a cross-section taken along line 24-24.
Figure 25A:
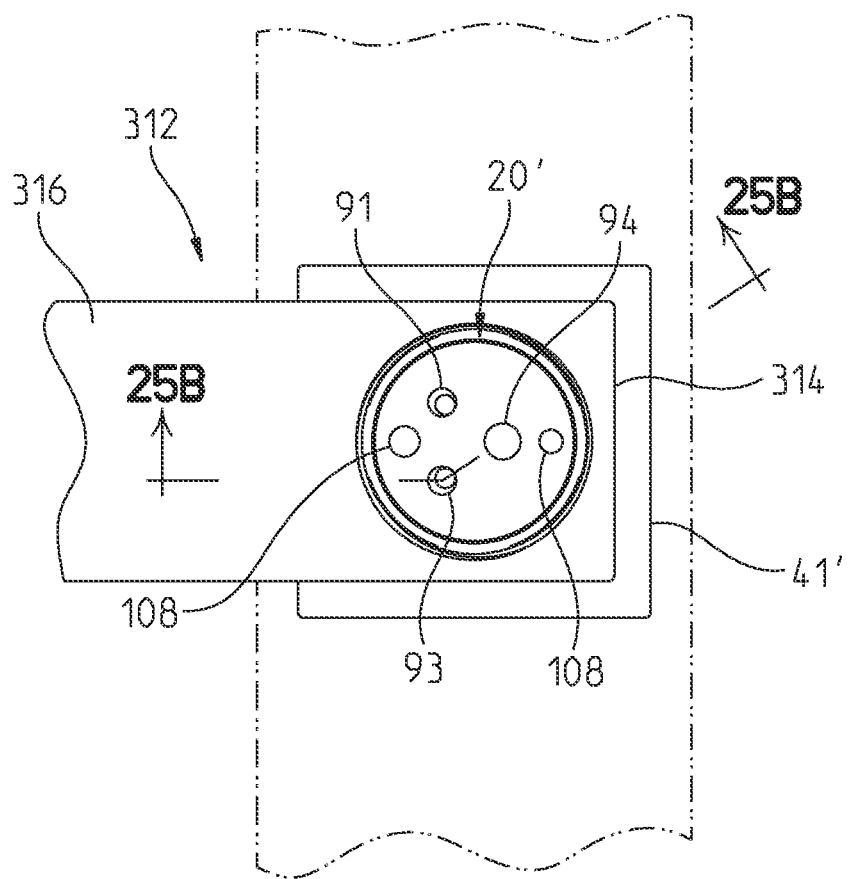
FIG. 25A is a top plan view of the faucet of FIG. 18, with the valve assembly removed for clarity.
Figure 25B:
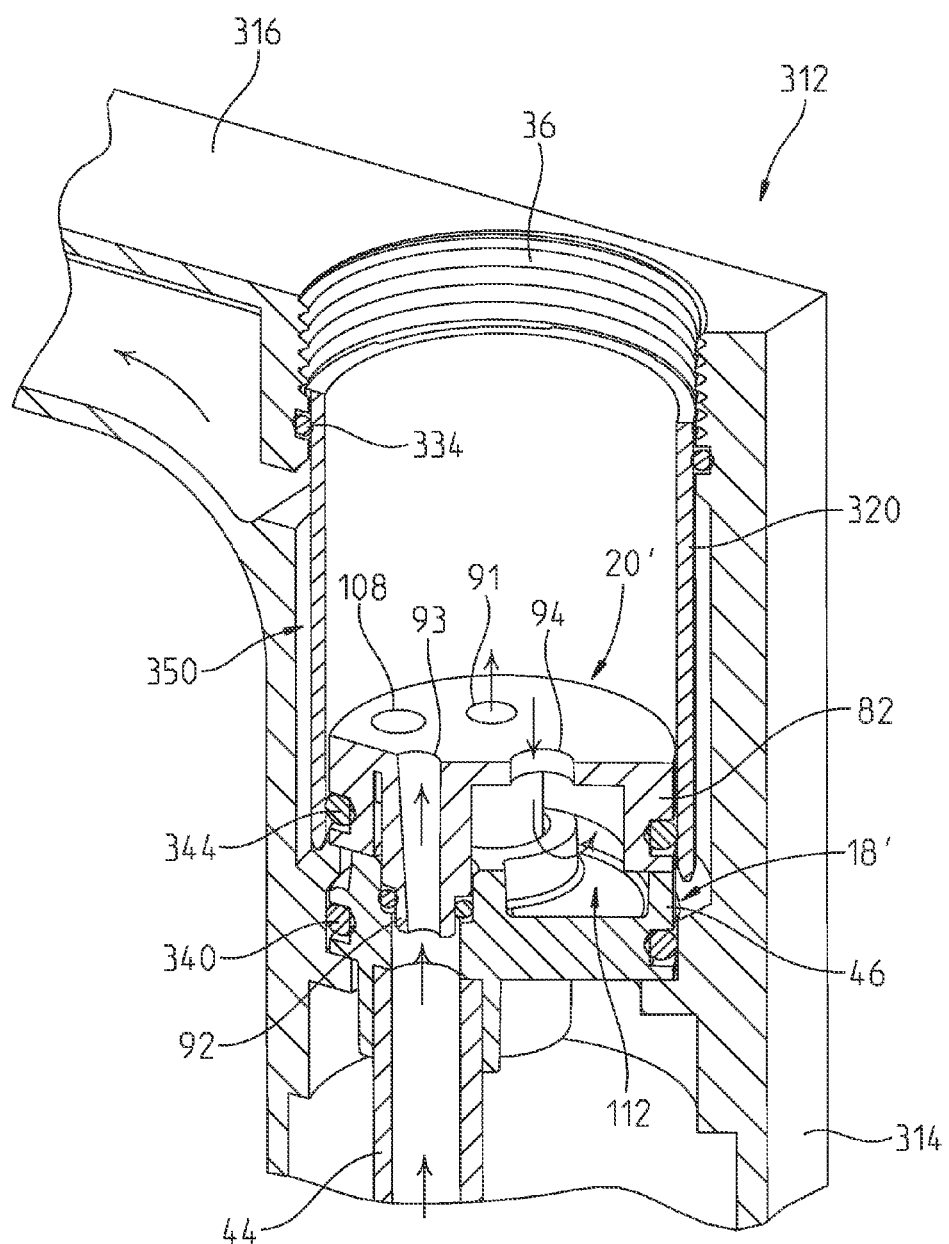
FIG. 25B is a cross-sectional view taken along line 25B-25B of FIG. 25A.

As shown in FIG. 24, the hub portion 314 includes a rectangular side wall 318. The outlet portion 216 of the spout assembly is supported above the fluid chamber 112 defined between the waterway assembly 18 and the waterway adapter 20 of the faucet 310. In order to provide fluid communication between the fluid chamber 112 and the outlet portion 316, a sleeve 320 is received over the valve assembly 22. Illustratively, the sleeve 320 is formed of drawn stainless steel; however, other materials may be substituted therefore, such as a polymer, such as a cross-linked polyethylene. The sleeve 320 lends itself to round cross-sectional spout hub designs where no corner water passages are feasible.

In the illustrative embodiment, the sleeve 320 includes a cylindrical side wall 322 extending longitudinally between upper and lower ends 324 and 326. The upper end 324 may include a plurality of radially extending tabs 328 configured to cooperate with the internal threads 36 of the spout assembly 312. The lower end 326 is supported by a plurality of ribs 330 extending axially above the upper surface of the lower wall of the waterway assembly 18'. The ribs 330 are circumferentially spaced to define water passageways 332 therebetween.

An outer upper radial seal, illustratively an elastomeric o-ring 334, is positioned between an upper portion of the sleeve 320 and the hub portion 314. More particularly, o-ring 334 provides a fluid seal between an outer surface 336 of the sleeve 320 and an inner surface 338 of the hub portion 314. An outer lower radial seal, illustratively an elastomeric o-ring 340, is positioned between the waterway assembly 18' and the hub portion 314. More particularly, o-ring 340 provides a fluid seal between an outer surface 342 of the lower wall of the waterway assembly 18' and an inner surface 338 of the hub portion 314. An inner radial seal, illustratively an elastomeric o-ring 344, is positioned between a lower portion of the sleeve 320 and the adapter 20'. More particularly, o-ring 344 provides a fluid seal between inner surface 346 of the sleeve 320 and an outer surface 348 of the adapter 20'. An annular waterway 350 is defined intermediate the sleeve 320 and the hub portion 314.

An aerator 326 illustratively defines the spout outlet 24 and is received within a holder 328. A conventional fastener, such as a set screw (not shown), may be used to secure the holder 328 and aerator 326 within the outlet portion 316 of the spout assembly 312.

In operation, water is supplied to the faucet 310 through the waterway assembly 18' to the valve assembly 22' via the adapter 20'. Water exits through the adapter 20' and then floods the fluid chamber 112 between the adapter 20' and the waterway assembly 18'. A lower end of the annular waterway 350 is sealed by o-ring 340, and an upper end of the waterway 350 is sealed by o-ring 334. O-ring 344 seals the annular waterway 350 from the valve assembly 22'. Water flows within the annular waterway 350 between the sleeve 320 and the hub portion 314, and then outwardly towards the outlet 24 of the spout assembly 312. The sleeve 320 and cooperating seals 334, 340, 344 maintain water within the spout assembly 312 and away from the exterior of the valve assembly 22'.

Although the invention has been described in detail with reference to certain preferred embodiments, variations and modifications exist within the spirit and scope of the invention as described and defined in the following claims.

The invention claimed is:

1. A fluid delivery device comprising:
   a spout assembly including a hollow hub portion and a hollow spout outlet portion, the hub portion configured to be supported by a mounting deck and the spout outlet portion cantilevered from the hub portion and having a spout outlet configured to dispense water;

a waterway assembly including a lower wall, a hot water inlet tube extending downwardly from the lower wall, a cold water inlet tube extending downwardly from the lower wall, the lower wall coupling the hot water inlet tube with the cold water inlet tube, one of a hot water receiving bore and a hot water tubular projection supported by the lower wall, and one of a cold water receiving bore and a cold water tubular projection supported by the lower wall;

an adapter positioned above the lower wall of the waterway assembly, the adapter including an upper wall, an outlet passageway extending through the upper wall, one of the other of the hot water tubular projection and the hot water receiving bore supported by the upper wall, and one of the other of the cold water tubular projection and the cold water receiving bore supported by the upper wall;

a fluid chamber defined between an upper surface of the lower wall of the waterway assembly and a lower surface of the upper wall of the adapter, the fluid chamber extending around the hot water tubular projection and the cold water tubular projection, wherein the outlet passageway and the spout outlet are in fluid communication with the fluid chamber;

a lower radial seal supported by the waterway assembly, the lower radial seal sealing between an outer surface of the lower wall of the waterway assembly and an inner surface of the hub portion;

an upper radial seal supported by the adapter, the upper radial seal sealing between an outer surface of the upper wall of the adapter and an inner surface of the hub portion; and a valve assembly supported by the adapter including a hot water inlet port in fluid communication with the hot water inlet tube, a cold water inlet port in fluid communication with the cold water inlet tube, and an outlet water port in fluid communication with the outlet passageway of the adapter, the valve assembly configured to control water flow through the hot water inlet tube and the cold water inlet tube to the fluid chamber.

2. The fluid delivery device of claim 1, wherein:

the lower wall of the waterway assembly includes an upwardly facing hot water receiving bore, and an upwardly facing cold water receiving bore; and the upper wall includes a downwardly extending hot water tubular projection received within the hot water receiving bore, and a downwardly extending cold water tubular projection received within the cold water receiving bore.

3. The fluid delivery device of claim 1, wherein the spout outlet portion is elevated above the fluid chamber.

4. The fluid delivery device of claim 1, wherein the adapter has a material hardness greater than that of the waterway assembly.

5. The fluid delivery device of claim 4, wherein the lower wall of the waterway assembly is formed of a polyethylene, and the upper wall of the adapter is formed of a polysulfone.

6. The fluid delivery device of claim 4, further comprising a face seal positioned between the adapter and the valve assembly, and a nut threadably received within the hub portion for securing the valve assembly within the spout assembly and compressing the face seal between the adapter and the valve assembly.

7. The fluid delivery device of claim 1, wherein the hub is cast from a lead-free brass.

8. The fluid delivery device of claim 1, wherein the waterway assembly includes an upwardly extending skirt, and the adapter includes a downwardly extending skirt, the skirt of the waterway assembly and the skirt of the adapter defining the fluid chamber between the upper surface of the lower wall of the waterway assembly and the lower surface of the upper wall of the adapter.

9. The fluid delivery device of claim 8, wherein an opening in the skirt of the waterway assembly cooperates with an opening in the skirt of the adapter.

10. A fluid delivery device comprising:

a spout assembly including a hollow hub portion and a hollow spout outlet portion, the hub portion including a rectangular side wall, and the spout outlet portion cantilevered from the hub portion and having a spout outlet configured to dispense water;

a waterway assembly including a lower wall, a hot water inlet tube extending downwardly from the lower wall, a cold water inlet tube extending downwardly from the lower wall, the lower wall coupling the hot water inlet tube with the cold water inlet tube;

an adapter positioned above the lower wall of the waterway assembly, the adapter including an upper wall and an outlet passageway extending through the upper wall;

a fluid chamber defined between the lower wall of the waterway assembly and the upper wall of the adapter, the outlet passageway in fluid communication with the fluid chamber, and the spout outlet portion elevated above the fluid chamber;

a valve assembly supported by the adapter, the valve assembly configured to control water flow through the hot water inlet tube and the cold water inlet tube to the fluid chamber;

a sleeve received around the valve assembly;

a waterway defined intermediate the sleeve and the hub portion to provide fluid communication between the fluid chamber and the spout outlet portion;

an outer upper radial seal positioned between an upper portion of the sleeve and the hub portion, an upper end of the waterway being sealed by the outer upper radial seal;

an outer lower radial seal positioned between the waterway assembly and the hub portion; and an inner radial seal positioned between a lower portion of the sleeve and the adapter, a lower end of the waterway being sealed by the inner radial seal.

11. The fluid delivery device of claim 10, wherein the adapter has a material hardness greater than that of the waterway assembly.

12. The fluid delivery device of claim 11, wherein the base of the waterway assembly is formed of a polyethylene and the adapter is formed of a polysulfone.

13. The fluid delivery device of claim 10, wherein the hub is cast from a lead-free brass.

14. The fluid delivery device of claim 10, further comprising a face seal positioned between the adapter and the valve assembly, and a nut threadably received within the hub portion for securing the valve assembly within the spout assembly and compressing the face seal between the adapter and the valve assembly.

15. The fluid delivery device of claim 10, wherein:

the waterway assembly includes an upwardly facing hot water receiving bore extending within the lower wall, and an upwardly facing cold water receiving bore extending within the lower wall;

the adapter includes a downwardly extending hot water tubular projection received within the hot water receiving bore, and a downwardly extending cold water tubular projection received within the cold water receiving bore; and the valve assembly includes a hot water inlet port in fluid communication with the hot water tubular projection of the adapter, a cold water inlet port in fluid communication with the cold water tubular projection of the adapter, and an outlet water port in fluid communication with the outlet passageway of the adapter.

16. A fluid delivery device comprising:

a spout assembly including a hollow hub portion and a hollow spout outlet portion, the hub portion configured to be supported by a mounting deck and the spout outlet portion cantilevered from the hub portion and having a spout outlet configured to dispense water;

a waterway assembly including a lower wall, a hot water inlet tube extending downwardly from the lower wall, a cold water inlet tube extending downwardly from the lower wall, the lower wall coupling the hot water inlet tube with the cold water inlet tube, one of a hot water receiving bore and a hot water tubular projection supported by the lower wall, and one of a cold water receiving bore and a cold water tubular projection supported by the lower wall;

an adapter positioned above the lower wall of the waterway assembly, the adapter including an upper wall, an outlet passageway extending through the upper wall, one of the other of the hot water tubular projection and the hot water receiving bore supported by the upper wall, and one of the other of the cold water tubular projection and the cold water receiving bore supported by the upper wall;

a fluid chamber defined between the lower wall of the waterway assembly and the upper wall of the adapter, the outlet passageway and the spout outlet in fluid communication with the fluid chamber;

a lower radial seal supported by the waterway assembly;

an upper radial seal supported by the adapter;

a valve assembly supported by the adapter including a hot water inlet port in fluid communication with the hot water inlet tube, a cold water inlet port in fluid communication with the cold water inlet tube, and an outlet water port in fluid communication with the outlet passageway of the adapter, the valve assembly configured to control water flow through the hot water inlet tube and the cold water inlet tube to the fluid chamber;

wherein the spout outlet portion is elevated above the fluid chamber; and wherein the hub portion includes a rectangular side wall, a bore formed within a corner of the side wall of the hub portion to provide fluid communication between the fluid chamber and the spout outlet portion.

17. A fluid delivery device comprising:

a spout assembly including a hollow hub portion and a hollow spout outlet portion, the hub portion configured to be supported by a mounting deck and the spout outlet portion cantilevered from the hub portion and having a spout outlet configured to dispense water;

a waterway assembly including a lower wall, a hot water inlet tube extending downwardly from the lower wall, a cold water inlet tube extending downwardly from the lower wall, the lower wall coupling the hot water inlet tube with the cold water inlet tube, one of a hot water receiving bore and a hot water tubular projection supported by the lower wall, and one of a cold water receiving bore and a cold water tubular projection supported by the lower wall;

an adapter positioned above the lower wall of the waterway assembly, the adapter including an upper wall, an outlet passageway extending through the upper wall, one of the other of the hot water tubular projection and the hot water receiving bore supported by the upper wall, and one of the other of the cold water tubular projection and the cold water receiving bore supported by the upper wall;

a fluid chamber defined between the lower wall of the waterway assembly and the upper wall of the adapter, the outlet passageway and the spout outlet in fluid communication with the fluid chamber;

a lower radial seal supported by the waterway assembly;

an upper radial seal supported by the adapter; and a valve assembly supported by the adapter including a hot water inlet port in fluid communication with the hot water inlet tube, a cold water inlet port in fluid communication with the cold water inlet tube, and an outlet water port in fluid communication with the outlet passageway of the adapter, the valve assembly configured to control water flow through the hot water inlet tube and the cold water inlet tube to the fluid chamber;

wherein the spout outlet portion is elevated above the fluid chamber; and wherein a sleeve is received around the valve assembly to provide fluid communication between the fluid chamber and the spout outlet portion.

18. The fluid delivery device of claim 17, further comprising an outer radial seal between an upper portion of the sleeve and the hub portion, wherein the lower radial seal is positioned between the waterway assembly and the hub portion, and the upper radial seal is positioned between a lower portion of the sleeve and the adapter.

* * * * *